US008224302B2

(12) United States Patent
Moride

(10) Patent No.: US 8,224,302 B2
(45) Date of Patent: Jul. 17, 2012

(54) MOBILE WIRELESS COMMUNICATION TERMINAL AND COMMUNICATION CONTROL METHOD

(75) Inventor: Shigeki Moride, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 421 days.

(21) Appl. No.: 11/796,400

(22) Filed: Apr. 27, 2007

(65) Prior Publication Data

US 2007/0202865 A1    Aug. 30, 2007

Related U.S. Application Data

(63) Continuation of application No. PCT/JP2004/016048, filed on Oct. 28, 2004.

(51) Int. Cl.
*H04L 29/06* (2006.01)

(52) U.S. Cl. ............... 455/414.3; 370/406; 370/400; 455/7

(58) Field of Classification Search ............. 455/7, 11.1, 455/406, 414.1–414.3, 418–420; 370/406, 370/274, 279, 293, 315, 389, 390, 392, 400, 370/408, 492, 501
See application file for complete search history.

(56) References Cited

U.S. PATENT DOCUMENTS

| | | | |
|---|---|---|---|
| 6,477,353 B1 | 11/2002 | Honda et al. | |
| 6,574,453 B1 | 6/2003 | Honda et al. | |
| 6,741,856 B2* | 5/2004 | McKenna et al. | 455/422.1 |
| 6,785,510 B2* | 8/2004 | Larsen | 455/11.1 |
| 7,113,784 B2* | 9/2006 | Fujiwara et al. | 455/435.1 |
| 7,145,898 B1* | 12/2006 | Elliott | 370/352 |
| 7,159,042 B1* | 1/2007 | Morvan et al. | 709/248 |
| 2001/0029547 A1* | 10/2001 | Kano et al. | 709/238 |
| 2002/0132614 A1 | 9/2002 | Vanluijt et al. | |
| 2003/0119537 A1* | 6/2003 | Haddad | 455/517 |
| 2004/0076154 A1* | 4/2004 | Mizutani et al. | 370/389 |
| 2004/0193863 A1* | 9/2004 | Zimmer et al. | 713/1 |
| 2005/0010653 A1* | 1/2005 | McCanne | 709/219 |
| 2005/0027871 A1* | 2/2005 | Bradley et al. | 709/227 |
| 2005/0255842 A1* | 11/2005 | Dumas et al. | 455/424 |

(Continued)

FOREIGN PATENT DOCUMENTS

JP        09-252277        9/1997

(Continued)

*Primary Examiner* — Kent Chang
*Assistant Examiner* — Ronald Eisner
(74) *Attorney, Agent, or Firm* — Greer, Burns & Crain, Ltd.

(57) ABSTRACT

In order to improve the efficiency of the data communication between mobile wireless communication terminals having a communication means mainly used for the wireless communication between the mobile wireless communication terminals and a wireless communication means mainly with a base station, a following terminal is used. Namely, it includes: a first communication unit used for communication with a specific base station; a second communication unit used for communication with other mobile wireless communication terminals; a storage area storing content data that can be used in the mobile wireless communication terminal and can be transmitted to other mobile wireless communication terminals; and a communication controller that obtains specific content data by searching the storage area when a request of the specific content data is accepted from a user of the mobile wireless communication terminal, transmitting a request to other mobile wireless communication terminals that can communicate via the second communication unit when the valid specific content data is not detected in the storage area, and transmitting a request to the specific base station via the first communication unit when the specific content data cannot be received from other mobile wireless communication terminals, which can communicate, within a predetermined time.

14 Claims, 15 Drawing Sheets

U.S. PATENT DOCUMENTS

| | | | |
|---|---|---|---|
| 2006/0223530 A1* | 10/2006 | Bumiller | 455/435.1 |
| 2009/0264104 A1* | 10/2009 | Lee et al. | 455/412.1 |

FOREIGN PATENT DOCUMENTS

| | | |
|---|---|---|
| JP | 10-032538 | 2/1998 |
| JP | 2001-352288 | 12/2001 |
| JP | 2002-164840 | 6/2002 |
| JP | 2002-176676 | 6/2002 |
| JP | 2002-368757 | 12/2002 |
| JP | 2003-110751 | 4/2003 |
| JP | 2003-319462 | 11/2003 |
| JP | 2004-085405 | 3/2004 |
| JP | 2004-106801 | 4/2004 |
| JP | 2004-523970 | 8/2004 |

* cited by examiner

FIG.4A
| SRC | DST | TYPE | URL or ID |
|---|---|---|---|
FIG.4B
| SRC | DST | TYPE | URL or ID | CONTENTS |
|---|---|---|---|---|
FIG.5A
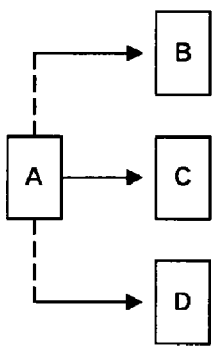
FIG.5B
|  | SRC | DST | TYPE | URL or ID |
|---|---|---|---|---|
| ADDRESSED TO B | A | B | REQ | xxxxxxxxx |
| ADDRESSED TO C | A | C | REQ | xxxxxxxxx |
| ADDRESSED TO D | A | D | REQ | xxxxxxxxx |
FIG.5C
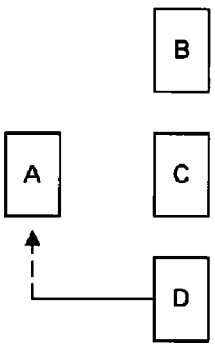
FIG.5D
|  | SRC | DST | TYPE | URL or ID | CONTENTS |
|---|---|---|---|---|---|
| FROM D | D | A | REPL | xxxxxxxxx | CONTENTS |

| SRC | DST | TTL | PID | ORG | TYPE | URL or ID |
|---|---|---|---|---|---|---|

FIG.7

| ORIGINATOR (ORG) | PACKET ID | RELAY TIME |
|---|---|---|
| ADDRESS | XXXXXXXXXXX | YYYYYYY |
| ⋮ | ⋮ | ⋮ |

FIG.8

| ORIGINATOR ADDRESS (ORG) | ADJACENT ADDRESS (SRC) |
|---|---|
| A | A |
| D | D |
| ⋮ | ⋮ |

FIG.9

|   |   | SRC | DST | TTL | PID | ORG | TYPE | URL or ID |
|---|---|---|---|---|---|---|---|---|
|   | A | A | bcas | 0 | 0000 | A | REQ | xxxxxxxxx |
| FIG.10B | B | B | bcas | 1 | 0000 | A | REQ | xxxxxxxxx |
|   | C | C | bcas | 2 | 0000 | A | REQ | xxxxxxxxx |

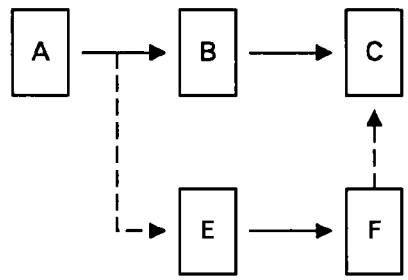
FIG.11A
FIG.11B
|  | SRC | DST | TTL | PID | ORG | TYPE | URL or ID |
|---|---|---|---|---|---|---|---|
| FROM B | B | bcas | 1 | 0000 | A | REQ | xxxxxxxxxx |
| FROM F | F | bcas | 2 | 0000 | A | REQ | xxxxxxxxxx |
FIG.11C
| ORIGINATOR (ORG) | PACKET ID | RELAY TIME |
|---|---|---|
| A | 0000 | YYYYYYYY |
| ⋮ | ⋮ | ⋮ |
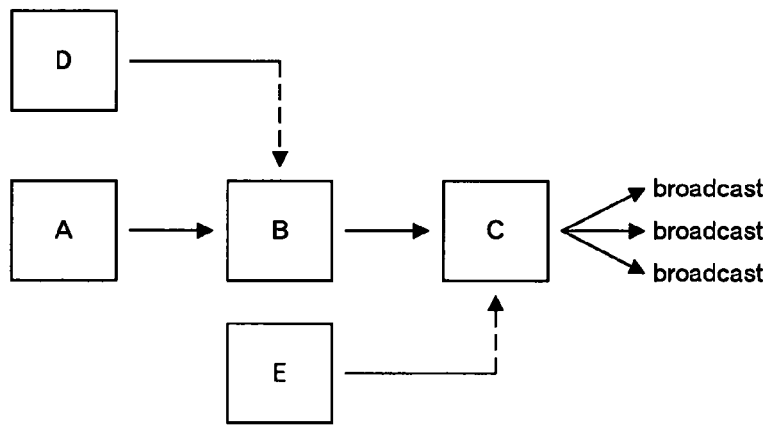
FIG.12

FIG.13

| | SRC | DST | TTL | PID | ORG | TYPE | URL or ID |
|---|---|---|---|---|---|---|---|
| FROM A | A | bcas | 0 | 0000 | A | REQ | xxxxxxxxx |
| FROM D | D | bcas | 0 | 3333 | D | REQ | xxxxxxxxx |

FIG.14

| | SRC | DST | TTL | PID | ORG | TYPE | URL or ID |
|---|---|---|---|---|---|---|---|
| A | B | bcas | 1 | 0000 | A | REQ | xxxxxxxxx |
| B | B | bcas | 0 | 1111 | B | REQ | xxxxxxxxx |
| D | B | bcas | 1 | 3333 | D | REQ | xxxxxxxxx |
| E | E | bcas | 0 | 4444 | E | REQ | xxxxxxxxx |

FIG.15

| | SRC | DST | TTL | PID | ORG | TYPE | URL or ID |
|---|---|---|---|---|---|---|---|
| A | C | bcas | 2 | 0000 | A | REQ | xxxxxxxxx |
| B | C | bcas | 1 | 1111 | B | REQ | xxxxxxxxx |
| C | C | bcas | 0 | 2222 | C | REQ | xxxxxxxxx |
| D | C | bcas | 2 | 3333 | D | REQ | xxxxxxxxx |
| E | C | bcas | 1 | 4444 | E | REQ | xxxxxxxxx |

MOBILE WIRELESS COMMUNICATION TERMINAL AND COMMUNICATION CONTROL METHOD

CROSS-REFERENCE TO RELATED APPLICATIONS

This application is a continuing application, filed under 35 U.S.C. section 111(a), of International Application PCT/JP2004/016048, filed Oct. 28, 2004.

TECHNICAL FIELD OF THE INVENTION

This invention relates to a mobile wireless communication technique, more particularly to a mobile wireless communication technique for efficiently carrying out data communication by combining short distance communication and long distance communication.

BACKGROUND OF THE INVENTION

For example, when a user requests data, which is not held in a wireless communication terminal provided on a car, the wireless communication terminal connects, for example, to a base station provided in advance via a telephone line, and acquires the requested data from a server connected to the base station. In such a case, because the communication fee occurs every time the terminal connects to the base station, the cost is problem.

By the way, JP-A-H9-252277 discloses a technique for efficiently and broadly delivering local information by carrying out communication typically carried out by a parent station by child stations. In this publication, mobile stations A to D equipped with a relay station deliver information transmitted by a fixed station according to a following procedure. That is, firstly, the information transmitted from the fixed station is received at the mobile station A, and is processed at the mobile station A according to a transmission side algorithm and a receipt side algorithm, and then is relayed to the mobile station B. After that, the information is relayed one by one from the mobile station B to D via C. By relaying the information in such a manner, the information can be broadly communicated by a small power. In addition, it is also possible to make the distribution area of the information local by defining the upper limit of the resending. Thus, because of the small power communication, a problem such as interference to undesired area, which is caused by the large power communication, can be prevented. However, there is no apparent description for how to properly use the short distance communication means and the long distance communication means and what processing is carried out for an information request occurred in a specific mobile station.

In addition, JP-A-H10-32538 discloses a mobile communication method capable of forming a pseudo-network without any wide range communication means, and reducing the system price and effectively using radio waves. More specifically, each mobile object is equipped with a mobile station having a weak radio wave receiving apparatus RX1 and a weak radio wave transmitting apparatus TX1, which can communicate only with neighboring objects, and a traffic information message received from the mobile station of the neighboring mobile object is relayed to mobile stations of other neighboring mobile objects and the traffic information message MS1 to be transmitted by itself is transmitted to mobile stations of other neighboring mobile objects. Or, each mobile object or fixed station is equipped with the weak radio wave receiving apparatus RX1 and the weak radio wave transmitting apparatus TX1, which can communicate only with neighboring objects, and information received from the mobile station of the neighboring mobile object or the fixed station is temporarily stored in a memory MM1, and necessary information is displayed on a display device DS1, and when other neighboring mobile object or fixed station appears, the stored information is resent. Also in this publication, there is no apparent description for how to properly use the short distance communication means and the long distance communication means and what processing is carried out for an information request occurred in a specific mobile station.

Furthermore, U.S. Pat. No. 6,477,353 discloses a technique for propagating information transmitted from an information source by hopping it between mobile stations. More specifically, the mobile station controls so as not to spread the information from the position of the information source by a predetermined distance or more, so as to spread the information only within a valid period when defining the valid period of the information, and so as not to repeat the delivery route and bypass the route. Especially, when the density of the mobile stations becomes high, the information to be transferred should be selected or limited, because the volume of the information to be transferred is explosively increased. When the mobile station is an information mobile terminal and individual users have the information mobile terminals, the information source is a retail store and transmits sales information and the like with the position information, for example. The user who holds the information mobile terminal looks at the sales information, and may go to the sales place or go out of the store if he or she has no interest. When the user goes out of the store and walks, the information mobile terminal held by another user exchanges the information with the information mobile terminal held by the user who was in the store. By repeating this processing, the sales information reaches an individual who has an interest in the sales information. However, there is no apparent description for how to properly use the short distance communication means and the long distance communication means and what processing is carried out for an information request occurred in a specific mobile station.

Furthermore, U.S. Pat. No. 6,574,453 discloses a method including, in a wireless transceiver of a receiving side, a step of measuring a electric field strength of a wireless signal received from another wireless transceiver; and a step of determining a response timing to the received wireless signal based on the measured electric field strength and, for example, a response policy concerning the electric field strength. In addition, the method further includes, in a wireless transceiver of a transmitting side, a step of designating the response policy concerning the electric field strength in the wireless transceiver that receives the wireless signal; and a step of transmitting the wireless signal including the designated response policy to the wireless transceiver. Thus, it becomes possible to designate the wireless transceiver, which exists in a region with which the wireless transceiver of the transmitting side desires to connect. However, there is no apparent description for how to properly use the short distance communication means and the long distance communication means.

In addition, JP-A-2004-106801 discloses a technique to improve traveling safety of a vehicle by enabling a codeless and hands-free call in the driving. Specifically, an information communication system has two main body apparatus side BT modules equipped in the main body; a call device side BT module that corresponds to one main body apparatus side BT module and is equipped in a mobile phone; and a call device side BT module that corresponds to the other main body apparatus side BT module and is equipped in a headset. The two main body apparatus side BT modules are set as a master, and the call device side BT modules are set as a slave against the master. The main body apparatus and the mobile phone are equipped in the vehicle, and the headset and the main body apparatus are positioned within a predetermined distance. Although an apparatus having the long distance communication means and the short distance communication means is disclosed, the spread of the information by the communication between such apparatuses is not considered so much.

Furthermore, JP-A-2003-110751 discloses a portable information apparatus and the like having a wireless telephone function and realizing low-cost and high-speed transfer wireless communication. More specifically, a portable phone is configured so that either a wireless telephone line or wireless communication is selectively used by switching, and it is possible to prohibit the receipt of the data transmitted via the wireless telephone line and/or to carry out a setting so that the wireless LAN line is preferentially used in the data transmission. In a case where the wireless LAN line is used when the communication with any information apparatus on the in-house dedicated line is carried out, the communication fee is reduced by using the company side system. In addition, because the kind of media, which intervene in the data transfer, is a little, high transfer speed is realized. Although the use method of the simple communication means based on the speed, the cost and/or the like is disclosed, there is no consideration for the information propagation by using the communication between the portable information apparatuses.

In addition, JP-A-2002-368757 discloses a delivery control method and the like in a multicast delivery service, in which data delivered in the past can be used in a wireless terminal, the prevention of data missing, which is caused by changes of radio wave propagation condition and lack of wireless resources, can be carried out, and further the charging for the information delivery used by the user can be carried out. Specifically, in an information delivery control method in a multicast delivery service, for delivering multicast information to a specific large number of wireless terminals in a service area via a wireless section from an information delivery apparatus, the wireless terminal accumulates multicast information delivered from the information delivery apparatus in advance, and notifies the information delivery apparatus of identification information to identify the accumulated multicast information at a timing determined by the wireless terminal, and the information delivery apparatus selects the multicast information based on the identification information notified by the wireless terminal, and delivers the selected multicast information to the wireless terminal. This technique is described for the multicast, namely for the communication of one to many, and data propagation between the wireless terminals is not considered.

The conventional techniques do not disclose a technique to efficiently carry out data communication between mobile wireless communication terminals having short distance communication means and long distance communication means.

SUMMARY OF THE INVENTION

Therefore, an object of this invention is to provide a communication control technique for improving the efficiency of the data communication between mobile wireless communication terminals having a communication means mainly used for the wireless communication between the mobile wireless communication terminals and a wireless communication means mainly with a base station.

A mobile wireless communication terminal according to this invention has a first communication unit used for communication with a specific base station; a second communication unit used for communication with other mobile wireless communication terminals; a storage area storing contents data that can be used in the mobile wireless communication terminal and can be transmitted to other mobile wireless communication terminals; and a communication controller that obtains specific contents data by searching the storage area when a request of the specific contents data is accepted from a user of the mobile wireless communication terminal, transmitting a request to other mobile wireless communication terminals that can communicate via the second communication unit when the valid specific contents data is not detected in the storage area, and transmitting a request to the specific base station via the first communication unit when the specific contents data cannot be received from other mobile wireless communication terminals, which can communicate, within a predetermined time.

Thus, because the specific contents data is requested in an order of the storage area, other mobile wireless communication terminals, and a server via the specific base station, the cost can be lowered than a case where the specific contents data is obtained from the server via the specific base station from the beginning. In addition, the communication between the mobile wireless communication terminals is effectively used not only for the distribution of the information, but also as an access means for the dispersively located information resources.

In addition, when it is judged that incomplete portion exists in the specific contents data received from other mobile wireless communication terminals, the aforementioned communication controller may transmit a request for data of at least incomplete portion to the specific base station via the first communication unit. Because the communication between the mobile wireless communication terminals has relatively low confidence degree because of the movement or the like, there is a case where the complete contents data cannot be obtained from other mobile wireless communication terminals. In such a case, by obtaining the data of at least incomplete portion from the server via the base station, the communication cost is lowered while obtaining the complete contents data.

In addition, the aforementioned communication controller may transmit a request by packet broadcast to other mobile wireless communication terminals, which can communicate via the second communication unit. When obtaining the specific contents data relating to the request from the user, a problem of the response to the user occurs if it takes time to search the neighboring mobile wireless communication terminal. Therefore, the request is broadcast effectively using the wireless characteristic.

Furthermore, when receiving the request of the specific contents data by the packet broadcast, the aforementioned communication controller may search the storage area, may reply the specific contents data when the valid specific contents data is detected in the storage area, and may transmit the request of the specific contents data by the packet broadcast to other mobile wireless communication terminals except a predetermined request unnecessary to transfer when the specific contents data is not detected in the storage area. Thus, by further transferring the broadcast request, it becomes possible to broaden the search range more than coverage of the radio wave. However, when the same request, which has been relayed once, is relayed, or the request, which has been relayed a predetermined times or more, is relayed, the load of the communication becomes too high. Therefore, it is discarded regarding that the transfer is unnecessary.

Furthermore, the aforementioned communication controller may register an address of the mobile wireless communication terminal of a generation source of the request, which is extracted from the request, in association with an address of the mobile wireless communication terminal of a transmission source of the request into a relay table, when the request of the specific contents by the packet broadcast is received, may refer to the relay table when a relay packet other than the broadcast packet is received, and may transmit the relay packet to the address of the mobile wireless communication terminal of the corresponding transmission source in the relay table, when an original destination address of the relay packet is registered as an address of the mobile wireless communication terminal of the generation source. By identifying the communication route based on the relay results, much efficient communication is carried out.

In addition, the aforementioned communication controller may store a packet including contents data and received from other mobile wireless communication terminals into the storage area regardless of whether or not the packet is addressed to this terminal. For example, even if the received packet including the contents data is simply relayed, the received packet is stored into the storage area. Then, it becomes possible to quickly respond to a request in the mobile wireless communication terminal and to respond to a request from the neighboring mobile wireless communication terminal.

Furthermore, the aforementioned communication controller may transmit a request of a list of stored contents data to other mobile wireless communication terminals, which can communicate, and may identify contents data to be requested for other mobile wireless communication terminals and transmit a request of the identified contents data to other mobile wireless communication terminal when the list of the contents data is received from other mobile wireless communication terminal. For example, by carrying out the aforementioned processing in a time range in which the communication load is low and there is no communication processing other than this processing, it is possible to update the contents data in the storage area to the latest state, and to additionally and automatically obtain the contents that match with the preference of the user of this mobile wireless communication terminal, for example. Furthermore, it is possible to enrich the contents data in the storage area.

Furthermore, the aforementioned communication controller may transmit a request of contents data identified based on a predetermined reference to a wireless communication base station via the second communication unit when the wireless communication base station connectable with the second communication unit is detected. For example, by obtaining the newest version of the contents data, which has already been held in the storage area, and specific contents data and the like, which matches with the user's interest, via the wireless communication base station, which is connectable via the second communication unit, and can communicate frequently without charge, it becomes possible to much efficiently use the contents data with lower cost.

Furthermore, the aforementioned communication controller may store the contents data in a complete state, which was received via the second communication unit from a wireless communication base station, into the storage area, when the wireless communication base station that can communicate via the second communication unit and broadcasts a predetermined contents data is detected. Thus, also in a case where the data broadcast station exists, when the contents data in the complete state can be obtained, data is effectively used by storing the contents data.

Incidentally, the mobile wireless communication terminal according to this invention may be configured by a computer hardware and a program to causing the computer hardware to realize the aforementioned functions. The program is stored into a storage medium or a storage device such as a flexible disk, a CD-ROM, a magneto-optical disk, a semiconductor memory, or a hard disk. In addition, the program may be distributed as digital signals over a network in some cases. Incidentally, data under processing is temporarily stored in the storage device such as a computer memory.

BRIEF DESCRIPTION OF THE DRAWINGS

FIGS. 4A and 4B are diagrams showing examples of packet formats;

FIGS. 5A to 5D are diagrams to explain specific examples of data communication from a request to a response;

FIG. 7 is a diagram showing an example of a packet format;

FIG. 8 is a diagram showing an example of a relayed packet table;

FIG. 9 is a diagram showing an example of a relay table;

FIGS. 10A and 10B are diagrams to explain a relay counter;

FIGS. 11A to 11C are diagrams to explain an example of packet delivery;

FIG. 12 is a diagram showing an example of a packet delivery route;

FIG. 13 is a diagram showing an example of a packet received by a mobile terminal B in a case of FIG. 12;

FIG. 14 is a diagram showing an example of a packet received by a mobile terminal C in a case of FIG. 12;

FIG. 15 is a diagram showing an example of a packet received by the mobile terminal C in a case of FIG. 12;

DETAILED DESCRIPTION OF THE PREFERRED EMBODIMENTS

Figure 1:
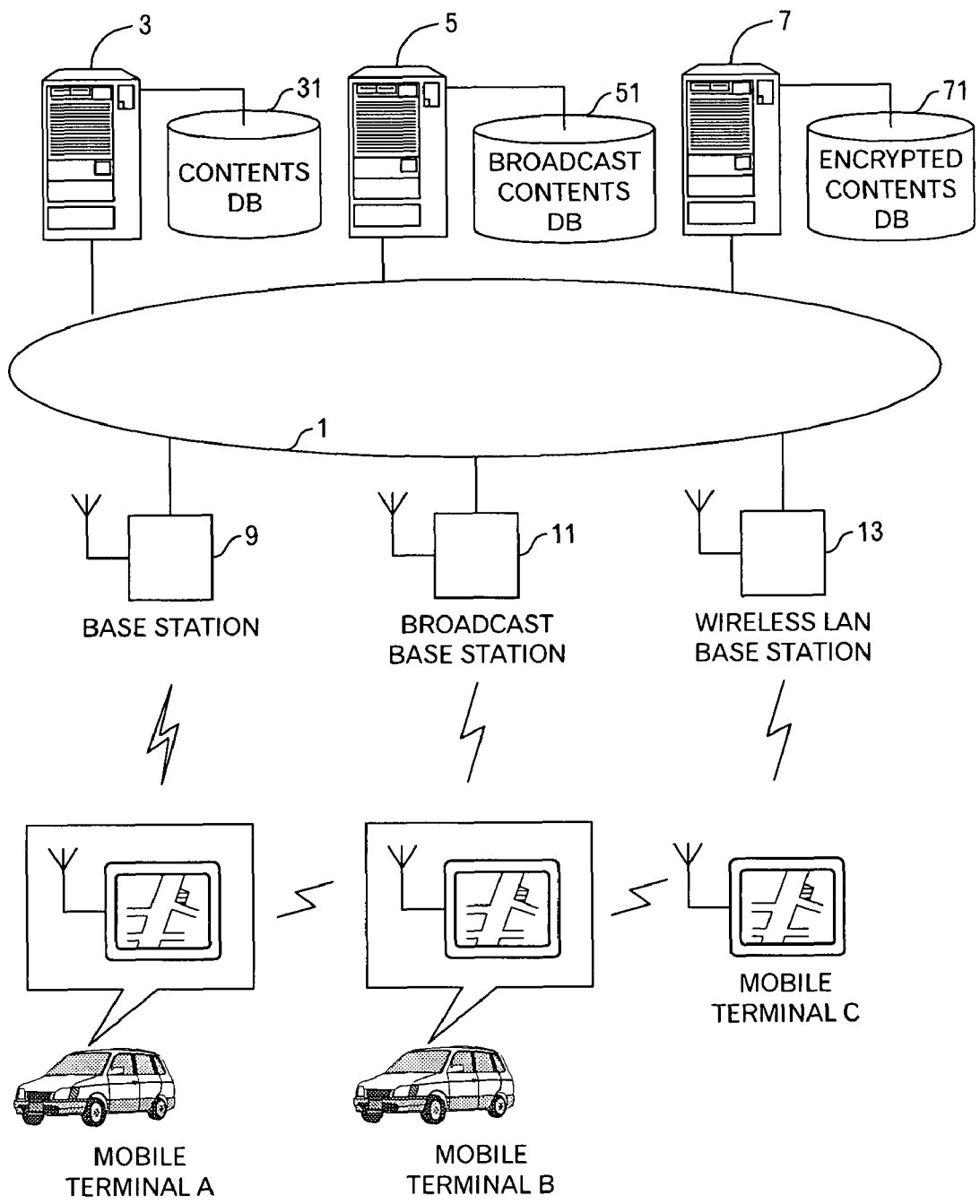
FIG. 1 is a system configuration diagram in one embodiment of this invention.

FIG. 1 shows a system outline diagram according to one embodiment of this invention. One or plural contents servers 3, one or plural broadcast contents servers 5, one or plural encrypted contents servers 7 are connected with a network 1, which is the Internet and/or a Local Area Network (LAN) in a service provider of this service. These may be unitarily managed by the service provider, and may be individually managed and connected with the network 1. The contents server 3 manages a contents DB 31, the broadcast contents server 5 manages a broadcast contents DB 51 and the encrypted contents server 7 manages an encrypted contents DB 71. In addition, one or plural base stations 9 for the mobile phones (including Personal Handy phone System (PHS)), one or plural broadcast base stations 11 provided in gas stations or other facilities, where contents data is broadcast by the wireless LAN method, for example, and one or plural wireless LAN base stations 13 provided in so-called hot spots, user's homes and others, which are the base stations capable of communicating by the wireless LAN, for example, are connected with the network 1. Incidentally, the communication method is not limited to the wireless LAN, and may be one conforming with other communication standards for the short distance communication (for example, standards such as infrared data communication (IrDA), Bluetooth or the like). Moreover, the aforementioned apparatuses may be connected with the network 1 through other networks such as the Internet.

Moreover, mobile terminals A, B and C are mobile wireless communication terminals, which can carry out the mobile phone communication and the short distance communication such as the wireless LAN, and they are installed in the cars, for example. However, a user who does not take the car or the like may walk around with this mobile wireless communication terminal. FIG. 1 shows that the mobile terminals A and B are the terminals installed in the cars, and the mobile terminal C is held by a walker. There is no limitation for the movement modes of these mobile terminals in this embodiment. In addition, the mobile terminals communicate each other by using the short distance wireless communication means such as the wireless LAN or the like.

Figure 2:
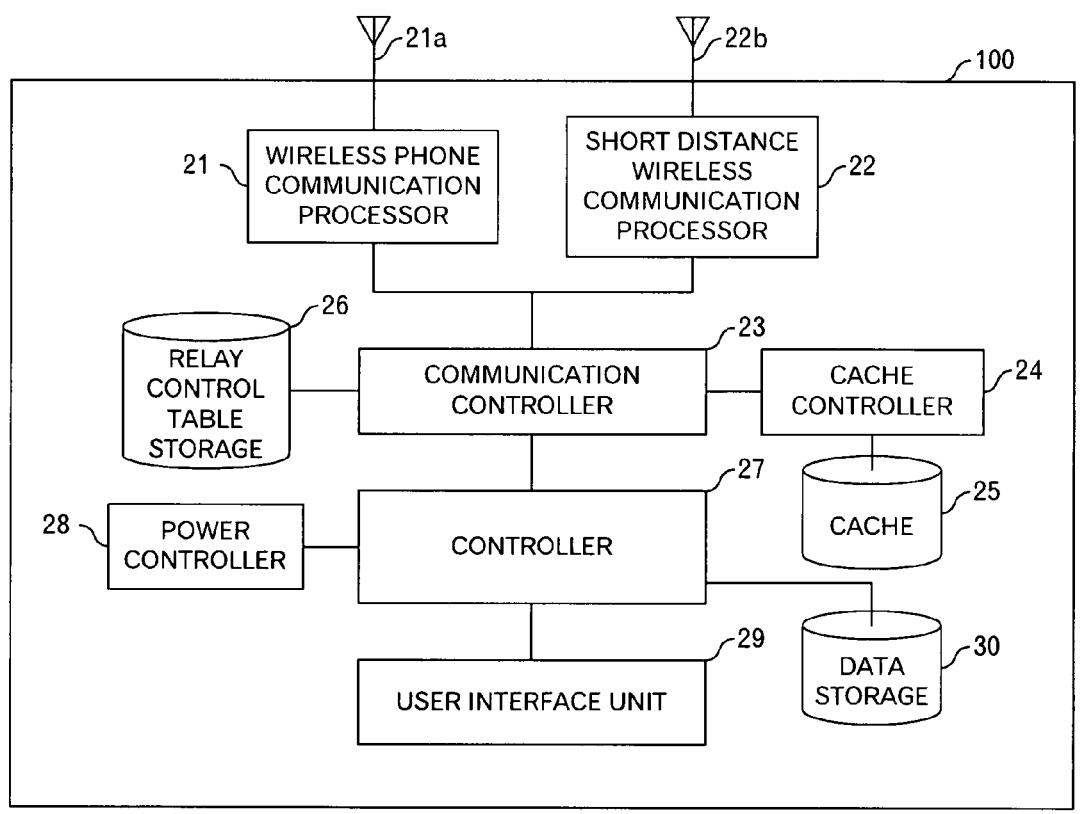
FIG. 2 is a functional block diagram of a mobile terminal in this embodiment.

FIG. 2 shows a functional block diagram of the mobile terminal. The mobile terminal 100 in this embodiment has a wireless phone communication processor 21 that carries out a processing for the mobile phone communication, a short distance wireless communication processor 22 that carries out a processing for the short distance communication such as the wireless LAN or the like, a communication controller 23 that carries out the communication control of the wireless phone communication processor 21 and the short distance wireless communication processor 22, a relay control table storage 26 that maintains a table referenced in the relay control processing in the communication controller 23, a cache 25 that stores various contents data, a cache controller 24 that controls the maintenance of the contents data in the cache 25, a power controller 28 that controls the power supply stop or the like, a data storage 30 that stores the data managed by the user of the mobile terminal 100, a user interface unit 29 including buttons, a display device such as a touch panel, and input-output devices such as mikes and speakers, and a controller 27 that controls the entire mobile terminal 100 to cooperate with the communication controller 23, the power controller 28, the user interface unit 29 and the data storage 30. Incidentally, the wireless phone communication processor 21 communicates by using an antenna 21a, and the short distance wireless communication processor 22 communicates by using an antenna 22b. Though the mobile terminals may have the additional functions such as a telephone function or the like other than the functions shown in FIG. 2, only the data communication is enough in this embodiment.

In the following, the characteristic portion of a processing of the system as shown in FIGS. 1 and 2 will be explained with reference to FIGS. 3 to 24. First, a processing in a case where the user of the mobile terminal A requests to display specific contents data will be explained with the reference to FIGS. 3 to 5. The controller 27 accepts the request of the specific contents data from the user through the user interface unit 29, and notifies the request to the communication controller 23. Then, the communication controller 23 detects that the contents data request event occurs (step S1), and instructs the cache controller 24 to confirm whether or not the requested contents data is stored in the cache 25. The cache controller 24 searches the cache 25, and confirms whether or not the requested contents data is stored (step S3). When the requested contents data is stored (step S5: Yes route), the cache controller 24 reads out the requested contents data from the cache 25, and outputs the contents data to the communication controller 23. The communication controller 23 receives the requested contents data from the cache controller 24, and outputs the contents data to the controller 27. The controller 27 outputs the requested contents data to the user through the user interface unit 29 (step S7).

On the other hand, when the requested contents data is not stored in the cache 25 (step S5: No route), the communication controller 23 causes the short distance wireless communication processor 22 to transmit a request of the requested contents data to neighboring mobile terminals (step S9). Although there are various methods of detecting the neighboring mobile terminals, for example, the short distance wireless communication processor 22 always checks whether or not other mobile terminals that transmits a predetermined signal exist, and when the predetermined signal is received, the short distance wireless communication processor 22 exchanges information such as an address or the like in advance. At this time, the short distance wireless communication processor 22 transmits a packet as shown in FIG. 4A. In FIG. 4A, SRC represents an address of the transmitting terminal (the transmission source address of the request), DST represents an address of the receiving terminal address (the destination address of the request), TYPE represents a packet type (here, REQ, because of the request), and URL or ID represents Uniform Resource Locator (URL) of the contents data relating to the request or identification information such as an ID, which is separately assigned to the contents data. Incidentally, when the existence of the neighboring mobile terminals cannot be confirmed, the step S9 may be skipped.

When the short distance wireless communication processor 22 in the neighboring mobile terminal receives the aforementioned request, the short distance wireless communication processor 22 outputs the request to the communication controller 23. The communication controller 23 requests the contents data relating to the request for the cache controller 24. The cache controller 24 confirms whether or not the contents data relating to the request is stored in the cache 25, and when the contents data is stored in the cache 25, the cache controller 24 reads out the contents data, and outputs the contents data to the communication controller 23. When the contents data is not stored in the cache 25, the cache controller 24 outputs a message to the effect that the contents data is not stored to the communication controller 23. When the communication controller 23 received the contents data, the communication controller 23 causes the short distance wireless communication processor 22 to transmit a response with the contents data to the mobile terminal of the requesting source. For example, a packet as shown in FIG. 4B is transmitted. In FIG. 4B, SRC represents an address of the transmitting terminal (an address of the terminal that received the request), DST represents an address of the receiving terminal (an address of the transmitting source of the request), TYPE represents a packet type (here, REPL, because of the response), URL or ID represents URL of the contents data relating to the request or identification information such as an ID, which is separately assigned to the contents data, and the contents represents the contents data relating to the request. Incidentally, the data completeness is disregarded in the communication between the mobile terminals, and the packets that did not reach or the like are not resent in this embodiment. This is because the mobile terminals might be moving and it might not be able to receive the lacked packet after all, even if it requests the lacked packet for the mobile terminal of the communication opponent many times. Incidentally, the response may not be replied or data representing no contents data exists may be replied, when no contents data exists in the cache 25.

For example, when the mobile terminals B, C and D exist near the mobile terminal A as shown in FIG. 5A, the mobile terminal A transmits requests as shown in FIG. 5B to the mobile terminals B, C and D. The format of the request to be sent is basically as shown in FIG. 4A, and for each request, the address of the mobile terminal B, C or D, which is a destination, is set into DST, REQ representing the request is set into TYPE, and the ID of the requested contents data is set into URL or ID. Only the mobile terminal D replies a response to the mobile terminal A as shown in FIG. 5C, when only the mobile terminal D among the mobile terminal B, C and D that received such a request has the requested contents data. In this response, as shown in FIG. 5D, the address of the mobile terminal D of the transmitting source is set into SRC, the address of the mobile terminal A of the requesting source is set into DST, REPL representing the response is set into TYPE, ID of the requested contents data is set into URL or ID, and the contents data is attached after URL or ID.

Then, the communication controller 23 judges whether or not the short distance wireless communication processor 22 received a response from the neighboring mobile terminal within a predetermined time (step S11). When any response cannot be received from the neighboring mobile terminals within the predetermined time, this is because the requested contents data is not stored in the cache 25 of the neighboring mobile terminals, the neighboring mobile terminals could not process the request well or there is no neighboring mobile terminal. Therefore, the communication controller 23 causes the wireless phone communication processor 21 to connect with the base station 9 and to transmit a request of the requested contents data to the contents server 3 (or the encrypted contents server 7) (step S13). This processing is similar to a processing in the mobile phone having a web browser. The contents server 3 reads out the contents data relating to the request from the contents DB 31, and transmits the contents data to the mobile terminal A through the base station 9. The wireless phone communication processor 21 of the mobile terminal A receives the contents data relating to the request from the contents server 3 through the base station 9, and outputs the contents data to the communication controller 23. The communication controller 23 outputs the contents data relating to the request to the cache controller 24 and causes the cache controller 24 to store the contents into the cache 25, and outputs the contents data to the controller 27. The controller 27 outputs the contents data relating to the request to the user through the user interface unit 29 (step S15).

On the other hand, when a response was received within the predetermined time at the step S11, the short distance wireless communication processor 22 receives the requested contents data included in the response from the neighboring mobile terminals without retrying as described above, and outputs the contents data to the communication controller 23 (step S17). The communication controller 23 checks whether or not any lack such as a loss of the packet or the communication error occurs, because of no retrying (step S19). When it is judged that any lack of the packet and the like does not occur, the communication controller 23 outputs the obtained requested contents data to the controller 27, and the controller 27 outputs the received requested contents data to the user through the user interface unit 29 (step S25).

When it is judged that the lack of the packet or the like occurs, the communication controller 23 causes the wireless phone communication processor 21 to connect with the base station 9, and to transmit a request of the lacked portion of the requested contents data to the contents server 3 (or the encrypted contents server 7) (step S21). Incidentally, a request of the entire requested contents data may be transmitted and an unnecessary portion may be discarded, or the data from the contents server 3 may be used preferentially. The contents server 3 reads out the contents data relating to the request from the contents DB 31, and transmits, for example, only the lacked portion to the mobile terminal A through the base station 9. The wireless phone communication processor 21 of the mobile wireless terminal A receives the lacked portion of the contents data relating to the request from the contents server 3 through the base station 9, and outputs the lacked portion of the contents data to the communication controller 23. The communication controller 23 outputs the entire contents data relating to the request to the cache controller 24, and causes the cache controller 24 to store the contents data into the cache 25 (step S23), and outputs the contents data to the controller 27. The controller 27 outputs the contents data relating to the request to the user through the user interface unit 29 (step S25).

When the contents relating to the request can be acquired from the cache 25 or the neighboring mobile terminals by carrying out such a processing, it becomes possible to acquire data at a lower cost compared with a case where the contents data is requested to the contents server 3 through the base station 9 immediately. Moreover, when the problem such as the lack occurs, the resending is not requested to the neighboring mobile terminals because the communication with the neighboring mobile terminals is unstable, but it is possible that the data is acquired from the contents server 3 through the base station 9. As a result, the necessary data is acquired at a low cost, and the unstableness of the data communication between the mobile terminals is complemented. Incidentally, the communication charge becomes cheap when only the lacked portion is acquired from the contents server 3. Furthermore, when the communication speed of the short distance wireless communication is faster than the data communication speed by the mobile phone, it becomes possible to acquire the contents data relating to the request in a short time.

Figure 3:
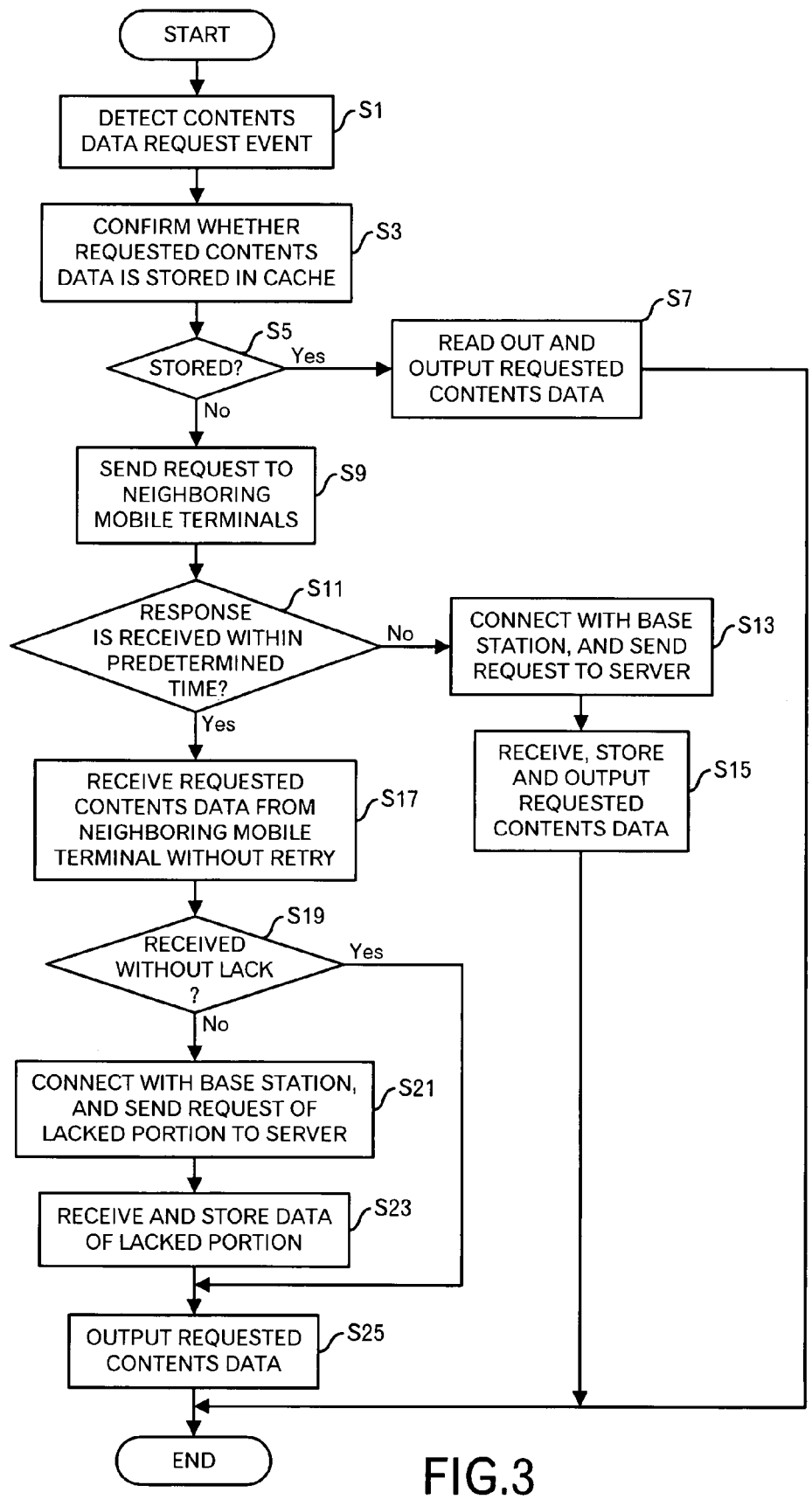
FIG. 3 is a diagram showing a first processing flow in this embodiment.

In the explanation of FIG. 3, an example was shown that the neighboring mobile terminals were grasped, and when plural mobile terminals exist in the vicinity, the requests are transmitted individually. However, precisely, it is difficult to detect other mobile terminals existing in the vicinity, and it takes time to identify the address and transmit the request in order. Then, the request packet may be transmitted by the packet broadcast in the wireless LAN or Internet Protocol (IP). In such a case, the broadcast address is set into DST in FIG. 4A to transmit the request packet. In certain circumstances, the response to the request might be transmitted by the packet broadcast. In this case, the broadcast address is set into DST in FIG. 4B to transmit the response. Thus, because it is possible to transmit the request to plural mobile terminals at the same time, and the processing is carried out by the mobile terminals that were able to receive the request, the processing to check the existence of the neighboring mobile terminals can be omitted. Moreover, the limited radio wave band can be used effectively.

Next, the case in which the packet broadcast is carried out will be considered further. When the packet broadcast is carried out, the use efficiency of the radio wave rises, and the possibility of early obtaining the response rises, because the request or the like can be transmitted to plural mobile terminals at once. However the reach range of the request stays within the range where the radio wave emitted by the requesting source mobile terminal reaches. Therefore, there is possibility where the mobile terminals that can respond to the request do not exist, when a lot of mobile terminals do not exist within the range where the radio wave reaches. Then, this embodiment adopts a mechanism that the broadcast request packet is retransferred (that is, relays) to other mobile terminals. However, because the limitless transferring will cause the unlimited expansion of the packet, this embodiment suppresses the request diffusion within the proper range by setting (1) the limitation for the number of relay times and (2) the limitation for the prohibition of re-relaying the same packets.

The case will be explained specifically with reference to FIGS. 6 to 16. When the short distance wireless communication processor 22 of the mobile terminal 100 receives a broadcast packet (step S31), the short distance wireless communication processor 22 outputs the received packet to the communication controller 23. The communication controller 23 analyzes the received packet, and confirms whether or not it is a request packet (step S33). Incidentally, this is because the response packets may be broadcast as described above, and it is assumed that the broadcast for the purpose of data diffusion may be carried out though it is not a response to the request. In addition, the broadcast packet received at the step S31 follows the format as shown in FIG. 7. That is, a transmitting source terminal address is set into SRC, a transmitting destination terminal address (however, it is the broadcast address, here) is set into DST, a relay counter is set into TTL, a packet ID is set into PID, the address of the mobile terminal that transmitted the packet first (the address of an original transmitting source terminal) is set into ORG, a packet type is set into TYPE (it is REQ indicating the request, here), the URL or ID of the contents data relating to the request is set into URL or ID. Incidentally, when it is the response packet or the like, the contents data is attached to this.

When it is judged that the received packet is the request packet, the communication controller 23 outputs the URL or ID of the requested contents data to the cache controller 24, and the cache controller 24 searches the cache 25 by using the URL or ID (step S35). When the requested contents data does not exist in the cache 25 (step S37: No route), the processing shifts to step S41. On the other hand, when the requested contents data is detected in the cache 25 (step S37: Yes route), the cache controller 24 reads out the requested contents data from the cache 25, and outputs the contents data to the communication controller 23. The communication controller 23 causes the short distance wireless communication processor 22 to reply the requested contents data as a response to the transmitting source of the broadcast packet (to the mobile terminal just before when the request has already been relayed) (step S39). Though, when the requested contents data exists in the cache of its own mobile terminal, the request packet is not transferred here, it may be judged whether or not the transfer should be carried out, after shifting to step S41. This is because other mobile terminals might be able to transmit the requested contents data, when the contents data was replied at the step S39 but not reached to the requesting source. Moreover, whether or not the processing shifts from the step S39 to the step S41 may be determined according to the relay counter value (the number of hops) or the like of the request packet.

When it was judged at the step S33 that the broadcast packet is not the request packet or when it was judged at the step S37 that the requested contents data does not exist in the cache 25, the communication controller 23 confirms the relayed packet table in the relay control table storage 26 (step S41). FIG. 8 shows one example of the relayed packet table. The example of FIG. 8 has a row of an originator ORG of the broadcast packet, a row of a packet ID and a row of a relay time. That is, the ORG data and the PID data of the packet are registered, and the relay time is also registered each time when the broadcast packet is relayed. Then, the communication controller 23 judges whether or not the same packet is registered in the relayed packet table by using the ORG data and the PID data of the received packet as keys (step S43). When it is judged that the packet registered in the relayed packet table is received again, the communication controller 23 discards the received packet (step S49).

On the other hand, when it is confirmed that a packet is not registered in the relayed packet table, the communication controller 23 increases the value of the relay counter (TTL) of the received packet by one (step S45). The value may be decreased until 0 from a predetermined value, although a case is explained where the value is increased here. Then, the communication controller 23 checks whether or not the value of the relay counter is equal to or greater than a predetermined threshold (step S47). When the value of the relay counter becomes equal to or greater than the predetermined threshold, the processing shifts to step S49 and the received packet is discarded because the transfer is unnecessary any more. On the other hand, when the value of the relay counter is less than the predetermined threshold, the communication controller 23 causes the short distance wireless communication processor 22 to transfer the received broadcast packet (step S51). This transfer is also carried out by broadcast.

Moreover, the communication controller 23 registers an original transmitting source (ORG), a packet ID (PID) and a relay time of the broadcast packet transferred this time into the relayed packet table (step S53). As a result, the same broadcast packet will never be transferred. In addition, the communication controller 23 updates a relay table stored in the relay control table storage 26 by using the packet data (step S55). FIG. 9 shows one example of the relay table. Like an example of FIG. 9, the relay table has a row of an address of an original transmitting source (ORG), a row of a SRC address of the received broadcast packet as an adjacent address. By maintaining such a table, when the response packet, for example, to the mobile terminal registered in the row of the address of the original transmitting source is received, it is understood to which mobile terminal is preferable to transmit the packet next. Although the positional relation at the stage of transferring the request packet is not always maintained, in order to identify to which mobile terminal a response is replied at the stage of relaying the response packet, the response packet is transferred to a mobile terminal that was the immediately previous relay mobile terminal, according to the positional relation at the stage where the request packet was transferred. At the step S55, the address of the original transmitting source (ORG)

and the address of the transmitting source (SRC) are extracted from the broadcast packet, and are correspondingly registered into the relay table.

Figure 6:
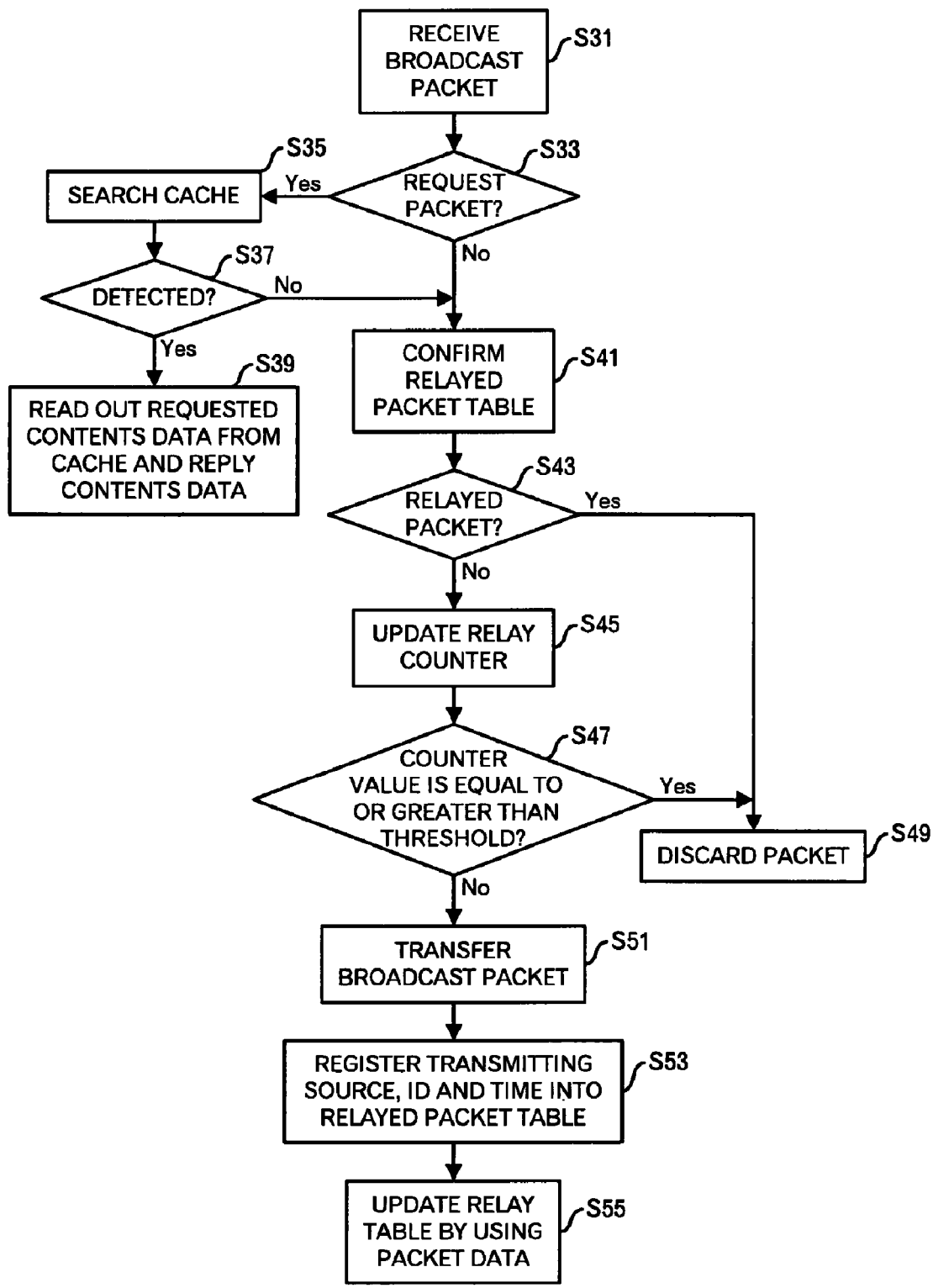
FIG. 6 is a diagram showing a second processing flow in this embodiment.
Figure 10A:
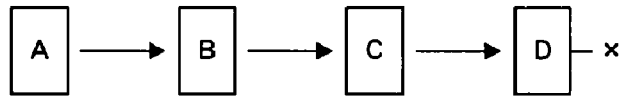

According to the processing flow of FIG. 6, when a broadcast packet (a request packet) is transmitted as shown in FIG. 10A, that is, in order of the mobile terminal A, the mobile terminal B, the mobile terminal C and the mobile terminal D, the packet as shown in FIG. 10B is transmitted. That is, in the packet transmitted from the mobile terminal A, the address of the mobile terminal A is set into SRC, the broadcast address (bcas) into DST, 0 into TTL (the relay counter is counted from 0, here), 0000 into PID, A into ORG, REQ into TYPE, and URL or the like into URL or ID as shown on the top of FIG. 10B. In the packet transmitted from the mobile terminal B that received this request packet, the address of the mobile terminal B set into SRC, the broadcast address (bcas) into DST, 1 into TTL (representing it was relayed once), 0000 into PID, A into ORG, REQ into TYPE, and URL or the like into URL or ID as shown on the middle of FIG. 10B. In the packet transmitted from the mobile terminal C that received this request, the address of the mobile terminal C set into SRC, the broadcast address (bcas) into DST, 2 into TTL (representing it was relayed twice), 0000 into PID, A into ORG, REQ into TYPE, and URL or the like into URL or ID as shown on the bottom of FIG. 10B. The mobile terminal D that received this request packet discards this request packet, because the value of TTL is incremented by one to obtain 3, which is equal to or more than the threshold. The propagation range can be prevented from infinitely extending, when the limitation by the relay counter is defined, although the propagation range of the request packet can be extended by re-transferring the broadcast packet as described above.

Next, as shown in FIG. 11A, a case will be explained in which a broadcast packet is transmitted from the mobile terminal A to the mobile terminal B and the mobile terminal E, then the broadcast packet is transmitted from the mobile terminal B to the mobile terminal C and from the mobile terminal E to the mobile terminal F, and further the broadcast packet is transmitted from the mobile terminal F to the mobile terminal C. In the case of this example, the broadcast packet having the same content is transmitted to the mobile terminal C twice. When considering this point, in the packet transmitted from the mobile terminal B to the mobile terminal C, the address of the mobile terminal B is set into SRC, the broadcast address (bcas) into DST, 1 into TTL (representing it was relayed once), 0000 into PID, A into ORG, REQ into TYPE, and URL or the like into URL or ID as shown on the top of FIG. 11B. In addition, as shown in the lower of FIG. 11B, in the packet transmitted from the mobile terminal F to the mobile terminal C, the address of the mobile terminal F is set into SRC, the broadcast address (bcas) into DST, 2 into TTL (representing it was relayed twice), 0000 into PID, A into ORG, REQ into TYPE, and URL or the like into URL or ID. By the way, in a case where the packet from the mobile terminal B to the mobile terminal C has early reached the mobile terminal C, a record as shown in FIG. 11C has been registered in the relayed packet table stored in the relay control table storage 26 of the mobile terminal C, when the broadcast packet reaches the mobile terminal C from the mobile terminal F. That is, the address of the original transmitting source (ORG) is registered as A and the packet ID (PID) is registered as 0000. Then, because the originator (ORG) and the packet ID (PID) of the broadcast packet transmitted from the mobile terminal F to the mobile terminal C are identical with the registered ones, the broadcast packet received from the mobile terminal F is discarded. Incidentally, because the relay counter TTL becomes 3 in the mobile terminal C and reaches the threshold, the broadcast packet is discarded in this point.

Thus, the broadcast packet is prevented from infinitely propagating.

In addition, the relay table will be explained with reference to FIGS. 12 to 16. First, as shown in FIG. 12, it is assumed that a broadcast packet is transmitted from the mobile terminal D to the mobile terminal B, a broadcast packet is transmitted from the mobile terminal A to the mobile terminal B and the broadcast packet is transmitted from the mobile terminal B to the mobile terminal C, and further a broadcast packet is transmitted from the mobile terminal E to the mobile terminal C, and furthermore received packets are broadcast from the mobile terminal C.

The broadcast packet that is received by the mobile terminal B is a packet as shown in FIG. 13. That is, the upper of FIG. 13 shows the packet from the mobile terminal A, and the address of the mobile terminal A is set into SRC, the broadcast address (bcas) into DST, 0 into TTL, 0000 into PID, A into ORG, REQ into TYPE, and URL or the like into URL or ID. On the other hand, the lower of FIG. 13 shows the packet from the mobile terminal D, and the address of the mobile terminal D is set into SRC, the broadcast address (bcas) into DST, 0 into TTL, 3333 into PID, D into ORG, REQ into TYPE, and URL or the like into URL or ID.

Moreover, the broadcast packet received by the mobile terminal C is a packet as shown in FIG. 14. The first tier of FIG. 14 shows the packet whose requesting source is the mobile terminal A, and the address of the mobile terminal B is set into SRC, the broadcast address (bcas) into DST, 1 into TTL (representing it was relayed once), 0000 into PID, A into ORG, REQ into TYPE, and URL or the like into URL or ID. The second tier of FIG. 14 shows the packet from the mobile terminal B, and the address of the mobile terminal B is set into SRC, the broadcast address (bcas) into DST, 0 into TTL, 1111 into PID, B into ORG, REQ into TYPE, and URL or the like into URL or ID. The third tier of FIG. 14 shows the packet whose requesting source is the mobile terminal D, and the address of the mobile terminal B is set into SRC, the broadcast address (bcas) into DST, 1 into TTL (representing it was relayed once), 3333 into PID, D into ORG, REQ into TYPE, and URL or the like into URL or ID. The fourth tier of FIG. 14 shows the packet from the mobile terminal E and, the address of the mobile terminal E is set into SRC, the broadcast address (bcas) into DST, 0 into TTL, 4444 into PID, E into ORG, REQ into TYPE, and URL or the like into URL or ID.

Furthermore, the broadcast packet that the mobile terminal C transmits is a packet as shown in FIG. 15. That is, the first tier of FIG. 15 shows the packet whose requesting source is the mobile terminal A, and the address of the mobile terminal C is set into SRC, the broadcast address (bcas) into DST, 2 into TTL (representing it was relayed twice), 0000 into PID, A into ORG, REQ into TYPE, and URL or the like into URL or ID. The second tier of FIG. 15 shows the packet whose requesting source is the mobile terminal B, and the address of the mobile terminal C is set into SRC, the broadcast address (bcas) into DST, 1 into TTL (representing is was relayed once), 1111 into PID, B into ORG, REQ into TYPE, and URL or the like into URL or ID. The third tier of FIG. 15 shows the packet whose requesting source is the mobile terminal C, and the address of the mobile terminal C is set into SRC, the broadcast address (bcas) into DST, 0 into TTL, 2222 into PID, C into ORG, REQ into TYPE, and URL or the like into URL or ID. The fourth tier of FIG. 15 shows the packet whose requesting source is the mobile terminal D, and the address of the mobile terminal C is set into SRC, the broadcast address (bcas) into DST, 2 into TTL (representing it was relayed twice), 3333 into PID, D into ORG, REQ into TYPE, and URL or the like into URL or ID. The fifth tier of FIG. 15 shows the packet whose requesting source is the mobile terminal E, and the address of the mobile terminal C is set into SRC, the broadcast address (bcas) into DST, 1 into TTL (representing it was relayed once), 4444 into PID, E into ORG, REQ into TYPE, and URL or the like into URL or ID.

Under such a situation, by carrying out the step S55 in FIG. 6, the relay table in the mobile terminal B is composed as shown in FIG. 9 based on the data of the received packet shown in FIG. 13. That is, it includes a record whose originator (ORG) address is A and adjacent (SRC) address is A, and a record whose originator (ORG) address is D and adjacent (SRC) address is D.

Figures 16, 17:
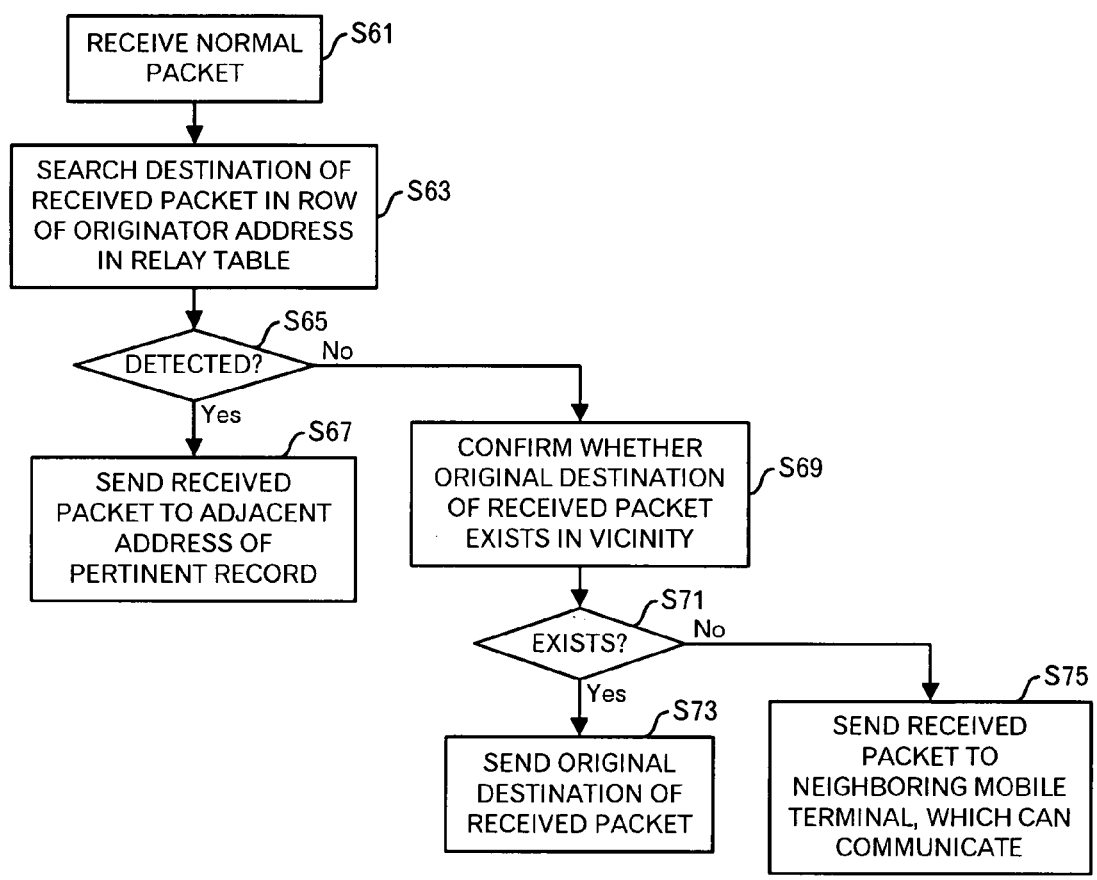
FIG. 16 is a diagram showing an example of a relay table.
FIG. 17 is a diagram showing a third processing flow in this embodiment.

In addition, the relay table in the mobile terminal C is configured as shown in FIG. 16 based on the data of the received packets shown in FIG. 14. That is, it includes a record whose originator (ORG) address is A and adjacent (SRC) address is B, a record whose originator (ORG) address is B and adjacent (SRC) address is B, a record whose originator (ORG) address is D and adjacent (SRC) address is B, and a record whose originator (ORG) address is E and adjacent (SRC) address is E.

Thus, by generating the relay table, the routing information to the mobile terminal of the requesting source (ORG) can be maintained in the mobile terminal that relayed the broadcast packet. Incidentally, although it is not guaranteed that this route is the shortest route, it can be said that it is a reasonable route, from the data that can be acquired in the mobile terminal.

Next, FIG. 17 shows a processing when a normal packet including a response packet is received by using the relay packet configured in this way. First, when the short distance wireless communication processor 22 of the mobile terminal 100 receives a normal packet including a response packet (step S61), the short distance wireless communication processor 22 outputs the received packet to the communication controller 23. It can be distinguished whether or not it is a response packet, because TYPE is REPL. The communication controller 23 retrieves the original destination (ORG DST) of the received packet in a row of the originator (ORG) address of the relay table in the relay control table storage 26 (step S63). When the original destination (ORG DST) of the received packet is detected in the row of the originator (ORG) address of the relay table (step S65: Yes route), the communication controller 23 transmits the received packet to the adjacent (SRC) address of the record in the relay table (step S67). On the other hand, when it is not detected (step S65: No route), the communication controller 23 checks whether or not an original destination of the received packet exists in the vicinity (step S69). When it is judged that the original destination exists (step S71: Yes route), the communication controller 23 transmits the received packet to the original destination (step S73). On the other hand, when it is judged that the original destination does not exist (step S71: No route), the communication controller 23 transmits the received packet to the neighboring mobile terminals that can communicate (step S75). This is because other neighboring mobile terminals have possibility to be able to relay appropriately. However, the step S75 may not be carried out.

By carrying out such a processing, it becomes possible to effectively relay the response packet, and deliver it to the mobile terminal of the requesting source. Moreover, the effective use of the communication bandwidth is achieved, compared with a case of replying the response packet by the broadcast.

Figures 18A, 18B:
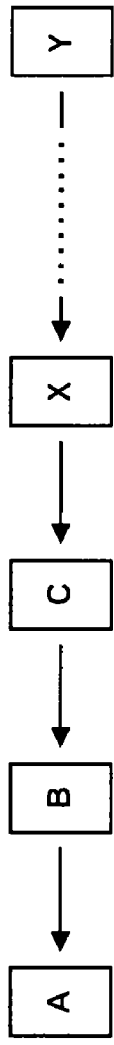
FIGS. 18A and 18B are diagrams to explain a delivery example of the packet.

An example of a case will be explained with reference to FIG. 18, where, for example, the relay table shown in FIG. 9 is maintained in the mobile terminal B, the relay table shown in FIG. 16 is maintained in the mobile terminal C, and the mobile terminal Y transmits contents data as a response packet because the mobile terminal Y has the contents data corresponding to the request. The response packet that the mobile terminal Y generated is transmitted to the mobile terminal C through the mobile terminal X as shown in FIG. 18A. In the packet transmitted from the mobile terminal X to the mobile terminal C, as shown in the first tier of FIG. 18B, the address of the mobile terminal X is set into SRC, the address of the mobile terminal C into DST, n into TTL (n is an arbitrary integer), xxxx into PID, A into ORG DST that is the original destination (the requesting source), Y into ORG, REPL into TYPE, and URL or the like into URL or ID, and the contents data is attached. The communication controller 23 of the mobile terminal C confirms whether or not A set as ORG DST exists in the row of the originator (ORG) address, by referring to the relay table shown in FIG. 16. Then, the communication controller 23 extracts the data (B in this case) of the corresponding adjacent (SRC) address in the relay table, because "A" is registered, and transmits the received packet to the mobile terminal B. In the transmitted packet, the address of the mobile terminal C is set into SRC, the address of the mobile terminal B into DST, n+1 into TTL (n is an arbitrary integer), xxxx into PID, A into ORG DST that is the original destination (the requesting source), Y into ORG, REPL into TYPE, and URL or the like into URL or ID, and the contents data is attached as shown in the second tier of FIG. 18B.

The communication controller 23 of the mobile terminal B confirms whether or not A set as ORG DST exists in the row of the originator (ORG) address, by referring to the relay table shown in FIG. 9. Then, the communication controller 23 extracts the data (A in this case) of the corresponding adjacent (SRC) address in the relay table, because "A" is registered, and transmits the received packet to the mobile terminal A. In the transmitted packet, the address of the mobile terminal B is set into SRC, the address of the mobile terminal A into DST, n+2 into TTL (n is an arbitrary integer), xxxx into PID, A into ORG DST that is the original destination (the requesting source), Y into ORG, REPL into TYPE, and URL or the like into URL or ID, and the contents data is attached as shown in the third tier of FIG. 18B.

As a result, an efficient relay of the response packet can be carried out.

When the aforementioned processing is carried out, specific contents data is transmitted to the mobile terminal, which requires the specific contents data. However, when no processing is carried out in the mobile terminal that carried out the relay processing, there is no change in the cache 25 of the mobile terminal that carried out the relay processing. In addition, it is impossible to provide the user at once when the user requests that contents data. Therefore, the contents data in the cache 25 is enriched or made to the latest by carrying out the processing as shown in FIG. 19, for example, to improve the response speed to the user.

Figure 19:
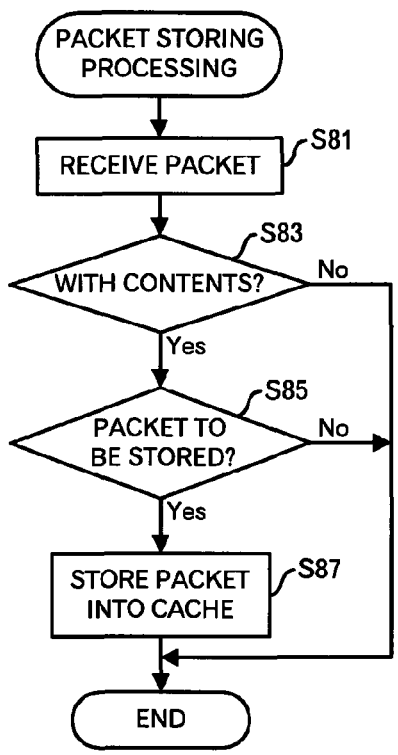
FIG. 19 is a diagram showing a fourth processing flow in this embodiment.

In FIG. 19, when the short distance wireless communication processor 22 of the mobile terminal 100 receives a packet (step S81), the short distance wireless communication processor 22 outputs the packet data to the communication controller 23. Then, the communication controller 23 confirms whether or not the contents are attached to the received packet, that is, TYPE of the received packet is REPL (step S83). When the contents are not attached to the packet, the processing is terminated. On the other hand, when the contents are attached to the packet, the communication controller 23 judges whether or not it is the contents data to be preserved (step S85). Whether or not it is the contents data to be preserved is determined in various viewpoints. For example, it is based on the free capacity of the cache 25, whether or not the old version of the contents data is held in the cache 25 or whether or not the attribute data conforms with the user's preference when the attribute data is attached to the contents data. The processing is terminated when it is judged that it is the contents data not to be preserved. On the other hand, the communication controller 23 outputs the contents data to the cache controller 24, when it is judged that it is the contents data to be preserved. The cache controller 24 stores the contents data received from the communication controller 23 into the cache 25 (step S87). Thus, it becomes possible to enrich the cache 25 of its own terminal and to acquire the latest version of the contents data by using the packets that are not addressed to its own terminal, such as the relay packets.

Incidentally, when the expiration data is attached to the contents data stored in the cache 25, the cache controller 24 searches the cache 25 at an arbitrary timing, and judges whether or not there is contents data whose expiration date has passed. When the contents data whose expiration date has passed exists, the contents data is discarded. Thus, it becomes possible to avoid the presentation of old contents data to the user, and when the cache 25 has only old contents data, it comes to carry out a processing to acquire the latest version. In addition, because a processing to confirm whether or not it is the latest version can be omitted by the automatic discard, the communication cost and time can be reduced. Incidentally, by using this mechanism, it becomes possible to appropriately handle the contents data in which the real-time handling is necessary, by setting "cache impossible" as an expiration date to the contents data (the data whose valid period is 0).

Figure 21A:
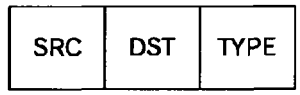
FIGS. 21A to 21C are diagrams showing examples of packet formats.
Figure 21B:
Figure 21C:
Figure 20:
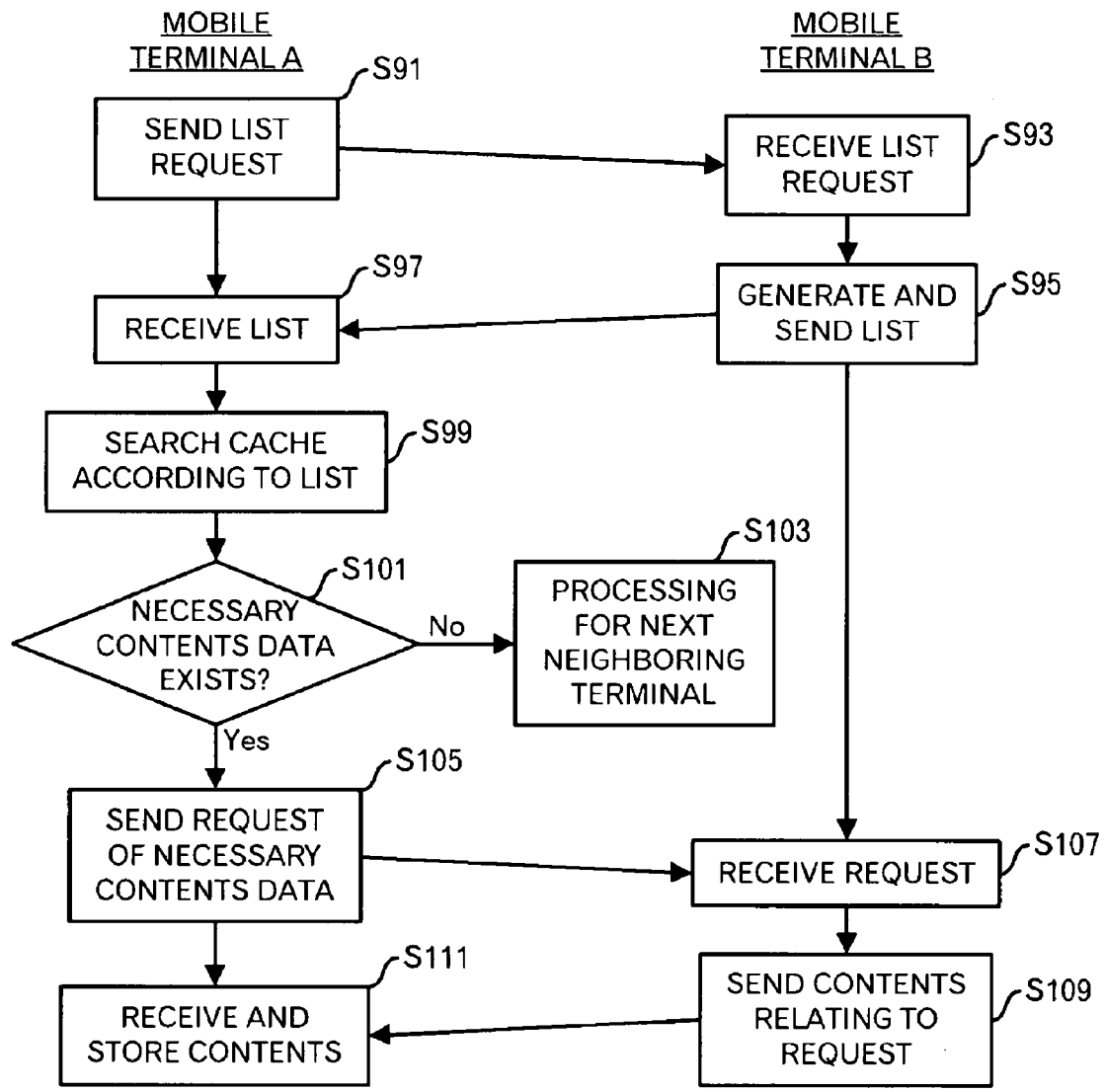
FIG. 20 is a diagram showing a fifth processing flow in this embodiment.

Furthermore, another mechanism to enrich the contents data in the cache 25 of the mobile terminal 100 and make it the latest is shown in FIGS. 20 and 21. When the processing load of the short distance wireless communication processor 22 becomes equal to or lower than a predetermined level, for example, the communication controller 23 of the mobile terminal A causes the short distance wireless communication processor 22 to transmit a list request to the mobile terminal B existing in the vicinity (step S91). As shown in FIG. 21A, in the packet for this list request, the address of the list request source mobile terminal is set into SRC, the address of the inquiry destination mobile terminal into DST, and LSRQ that is a code indicating the list request into TYPE, for example. The short distance wireless communication processor 22 of the mobile terminal B receives the list request from the mobile terminal A (step S93), and outputs the list request to the communication controller 23. The communication controller 23 outputs the list request to the cache controller 24, and then the cache controller 24 carries out a list generation processing of the stored contents data for the cache 25. The list generation processing is a processing to extract URL or ID added to each item of the contents data and the contents creation time and date. The generated list is output from the cache controller 24 to the communication controller 23, and the communication controller 23 transmits the packet for the list to the mobile terminal A (step S95). The packet for the list is a packet as shown in FIG. 21B, for example. That is, the address of the list transmitting source mobile terminal is set into SRC, the address of the list requesting source mobile terminal into DST, REPL that is a code indicating the response into TYPE, and the extracted list data are attached as list elements. Only the extracted amounts of the list elements are attached, and each list element is composed of URL or ID and the contents creation time and data as shown in FIG. 21C.

The short distance wireless communication processor 22 of the mobile terminal A receives the packet for the list from the mobile terminal B (step S97), and outputs the list to the communication controller 23. The communication controller 23 stores the list data into a storage device. Then, the communication controller 23 outputs a confirmation request for each list element to the cache controller 24, and the cache controller 24 searches the cache 25 based on the received list elements (step S99). Then, the cache controller 24 judges whether or not necessary contents data for the mobile terminal A exists (step S101). Here, all the contents data, which is not held, are judged to be necessary contents data, and the contents data whose creation date and time are newer than that of the held contents data are judged to be necessary contents data, for example. Other reference may be determined.

When it is judged that the necessary contents data does not exist, the processing shifts to a processing of the next neighboring mobile terminal (step S103). On the other hand, when the necessary contents data exists, the cache controller 24 outputs URL or ID of the necessary contents data to the communication controller 23. The communication controller 23 causes the short distance wireless communication processor 22 to transmit a request of the contents data to the mobile terminal B based on the received URL or ID of the contents data (step S105). When plural necessary contents data sets exist, the short distance wireless communication processor 22 generates and transmits plural requests. Plural URLs or IDs may be included in one packet when it is permitted on the protocol. The short distance wireless communication processor 22 of the mobile terminal B receives the contents request from the mobile terminal A (step S107), and outputs the request to the communication controller 23. The communication controller 23 outputs URL or ID relating to the request to the cache controller 24, and the cache controller 24 searches the cache 25 by using the URLs or IDs, and then reads out the corresponding contents data from the cache 25. The cache controller 24 outputs the contents data to the communication controller 23, and the communication controller 23 composes a response packet including the contents data and causes the short distance wireless communication processor 22 to transmit the response packet to the mobile terminal A (step S109). The short distance wireless communication processor 22 of the mobile terminal A receives the response packet from the mobile terminal B, and outputs the response packet data to the communication controller 23. The communication controller 23 outputs the received contents data to the cache controller 24, and the cache controller 24 stores the contents data into the cache 25 (step S111).

By carrying out such a processing, the contents data in the cache 25 can be enriched or made to the latest, and the use efficiency of the cache can be improved.

Furthermore, in this embodiment, a further device is made in order to enrich the contents data in the cache 25 of the mobile terminal 100 or make it the latest. For this purpose, the broadcast base station 11, and the broadcast contents server 5 and the broadcast contents DB 51, which are shown in FIG. 1, are used. The broadcast base station 11 is provided, for example, at convenience stores, fast food shops, gas stations and other places, and the broadcast contents server 5 causes the broadcast base station 11 to broadcast the contents data for broadcasting, which is stored in the broadcast contents DB 51, by the wireless LAN, for example. When the mobile terminal 100 approaches the broadcast base station 11 up to the range where the radio wave from the broadcast base station 11 reaches, the mobile terminal 100 can receive the broadcast contents data automatically. Incidentally, the broadcast base station 11 does not respond to a request from the mobile terminal 100, because the broadcast base station 11 basically carries out only the transmission of the broadcast contents data.

Moreover, the wireless LAN base station 13 shown in FIG. 1 is a wireless LAN base station connected with a high-speed communication network, which is a wireless LAN base station in the user's home of the mobile terminal 100, a belonging company or others, or hot spots or the like. The interactive communication is possible with such wireless LAN base stations 13, and the mobile terminal 100 transmits a request of specific contents data to the contents server 3, the encrypted contents server 7 or the like, receives the contents data relating to the request from the contents server 3 or the encrypted contents server 7, and can enrich the contents data in the cache 25 and make it the latest.

A processing using these broadcast base station 11 and wireless LAN base station 13 will be explained with reference to FIG. 22. The short distance wireless communication processor 22 of the mobile terminal 100 searches for the wireless LAN base station 13, and when it is detected (step S121: Yes route), the short distance wireless communication processor 22 outputs a notification representing that the communication with the wireless LAN base station 13 has become possible to the communication controller 23. The communication controller 23 instructs the cache controller 24 to identify contents data to be requested in response to the notification. The cache controller 24 searches the cache 25, and identifies the contents data satisfying a predetermined condition such as the contents data whose expiration date becomes close, the contents data that a predetermined time and more has passed since the creation date and time, the contents data that was discarded because the expiration date has passed and whose URL or ID is maintained, and the contents data that user seems to request and is identified from the attribute data when the user attribute data can be obtained (step S123). The cache controller 24 outputs the data of URL or ID of the identified contents data to the communication controller 23, and the communication controller 23 generates a request packet by using the URL or ID of the contents data, and causes the short distance wireless communication processor 22 to transmit the request packet to the contents server 3 or the encrypted contents server 7 through the wireless LAN base station 13 (step S125). The wireless LAN base station 13 transfers the packet to the address of the packet when the wireless LAN base station 13 receives the request packet from the mobile terminal 100. When the contents server 3 or the encrypted contents server 7 receives the request packet, the contents server 3 or the encrypted contents server 7 reads out the contents data relating to the request from the contents DB 31 or the encrypted contents DB 71 and transmits a response packet to which the contents data is attached to the mobile terminal 100 through the wireless LAN base station 13.

The short distance wireless communication processor 22 of the mobile terminal 100 receives the response packet to which the contents data is attached, from the wireless LAN base station 13, and outputs the response packet to the communication controller 23. The communication controller 23 receives the response packet to which the contents data is attached, and outputs the contents data to the cache controller 24. The cache controller 24 stores the received contents data into the cache 25 (step S127).

When the wireless LAN base station 13 cannot be detected at the step S121 or after the step S127, the short distance wireless communication processor 22 of the mobile terminal 100 searches for the broadcast base station 11, and when the broadcast base station can be detected (step S129: Yes route), the short distance wireless communication processor 22 outputs a packet with the contents data, which was received from the broadcast base station 11, to the communication controller 23. The communication controller 23 discards imperfect contents data including the lack or the like, and outputs only the complete contents data to the cache controller 24. The cache controller 24 stores the received contents data into the cache 25 (step S131). However, the cache controller 24 searches the cache 25 before storing the contents data, and judges whether or not the contents data should be stored. There are some cases where the contents data is not stored, such as where the same contents data has already been received or an old version data was received for some reasons, for example. Incidentally, the data receipt from the broadcast base station 11 continues as long as the communication quality more than a predetermined level is kept.

The aforementioned processing is carried out until the communication controller 23 instructs the end of the communication processing (for example, a power supply stop or the beginning of other communication processing) (step S133).

Thus, the use efficiency of the cache 25 is improved and the response speed to the user becomes higher, because the cache 25 of the mobile terminal 100 is enriched or made to the latest.

Figure 22:
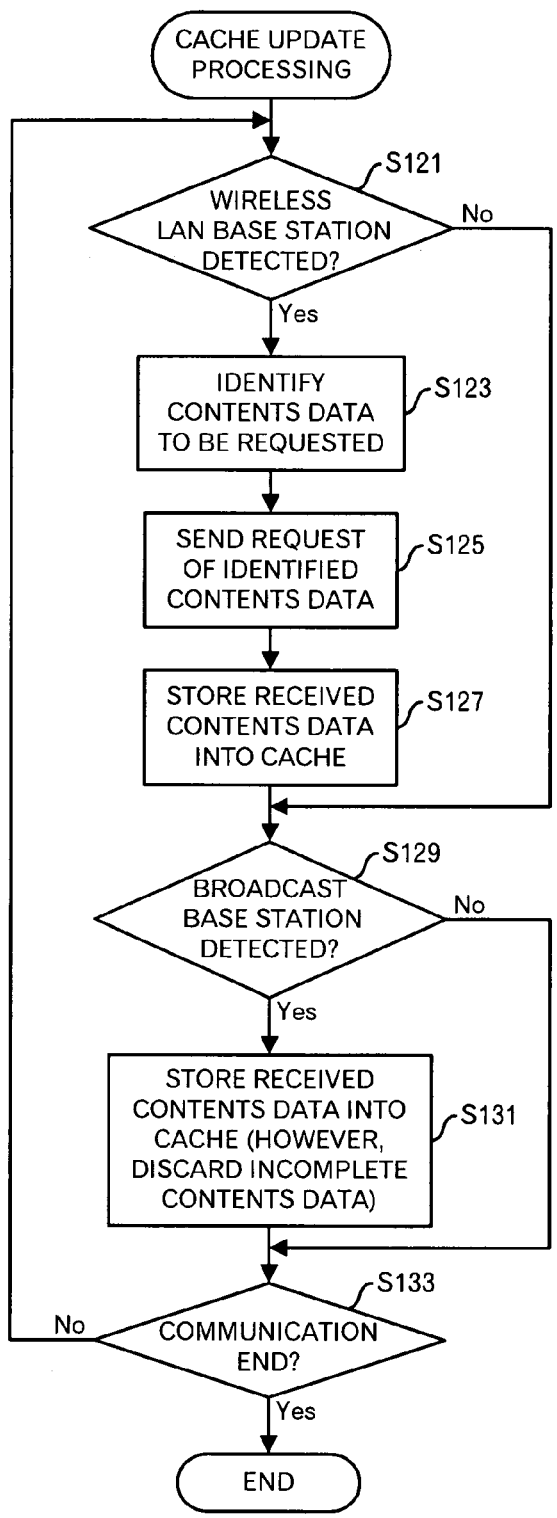
FIG. 22 is a diagram showing a sixth processing flow in this embodiment.
Figure 23:
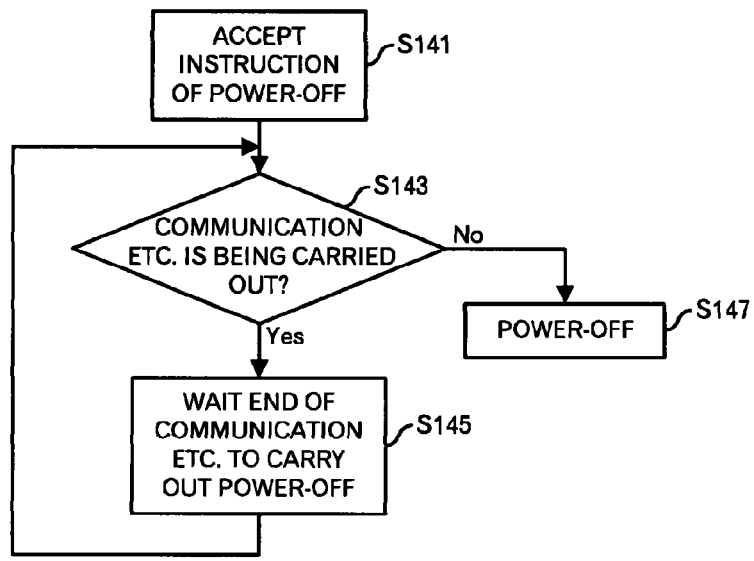
FIG. 23 is a diagram showing a seventh processing flow in this embodiment.

Incidentally, because the processing as shown in FIG. 20 and FIG. 22 are carried out without any instruction from the user, the user might not know whether or not the processing is being carried out. Therefore, even if an instruction for the power-off is input through the user interface unit 29 during the processing, it is undesirable to immediately stop the power supply for the entire mobile terminal 100. Then, when the instruction for the power-off from the user through the user interface unit 29 is accepted (step S141), the instruction input is sent to the controller 27 as shown in FIG. 23. This instruction input is transmitted to the power controller 28, and the power controller 28 inquires the communication controller 23 through the controller 27 whether or not the communication is being carried out (including the data storage processing or the like to the cache 25 by the cache controller 24). When a notification representing the communication or the like is not carried out is received from the communication controller 23 through the controller 27 (step S143: No route), the power controller 28 turns off the power supply for the entire mobile terminal 100 (step S147). On the other hand, when a notification representing the communication or the like is being carried out is received from the communication controller 23 (step S143: Yes route), the power controller 28 waits the end of the communication or the like for the power-off (step S145). However, it is possible that the power supply continues for necessary portions such as the communication controller 23, the cache controller 24, the cache 25, the short distance wireless communication processor 22 and the wireless phone communication processor 21, and the power supply is stopped for unnecessary portions such as a display device or the like. Meanwhile, a message such as "please wait for a while" may be displayed on the display device, because of the problem of the battery or the like. Then, the processing returns to the step S143.

Thus, it is able to avoid the infection on enrichment of the contents data in the cache 25 or the like, because it is possible to continue the processing until the necessary communication processing or the like ends.

Incidentally, because the mobile terminals are moving, the communication becomes unstable easily. Therefore, it is desirable to transmit and receive data with a high use frequency as much as possible preferentially in the communication with other mobile terminals, in the communication with the contents server 3 or the like through the wireless LAN base station 13 or the broadcast base station 11. For example, by totaling the data of the request frequency in the contents server 3 or the like or by totaling the data of the use frequency in the mobile terminals, when plural contents data sets are transmitted, they are transmitted in descending order of the request frequency or the use frequency based on the totaling result. As a result, the possibility that the contents data transmitted at the beginning is used effectively by the destination mobile terminals or the like becomes higher, even when the communication situation deteriorates on the way.

Furthermore, in this embodiment, there are a case where the electronic signature is added to the contents data and a case where the contents data is encrypted. As described above, because the contents data is circulated among the mobile terminals, the data may be modified on the way and false data may be circulated. In order to secure some reliability for the contents data circulated among the mobile terminals, the creator or distributor of the contents data generates an electronic signature to the contents data to be circulated by the private key in the public key cryptosystem, for example, and then a set of contents data and the electronic signature is transmitted from the contents server 3 or the broadcast contents server 5. Thus, it becomes possible to prevent the distribution of the forgery contents data and the damaged contents data (presentation to the user).

Moreover, although the distribution management of the pay contents data is required when circulating the pay contents data, the circulation of the plaintext contents data seriously influences the business. Thus, the contents data is encrypted and the encrypted state is kept while circulating among the mobile terminals. Then, by introducing a mechanism where the plaintext contents data converted by decrypting can be used, but cannot be stored into the cache 25, the contents data can be circulated freely by using the cache 25 of the mobile terminals 100 until it is used. Then, it is assumed that a method that the user pays the charge to use the contents data when acquiring the key is adopted. Incidentally, when the request is received, the encrypted contents server 7 reads out the encrypted contents data from the encrypted contents DB 71, and transmits the encrypted contents data to the mobile terminal 100 of the requesting source. Moreover, when the key is transmitted, the account processing or the like is carried out.

Figure 24:
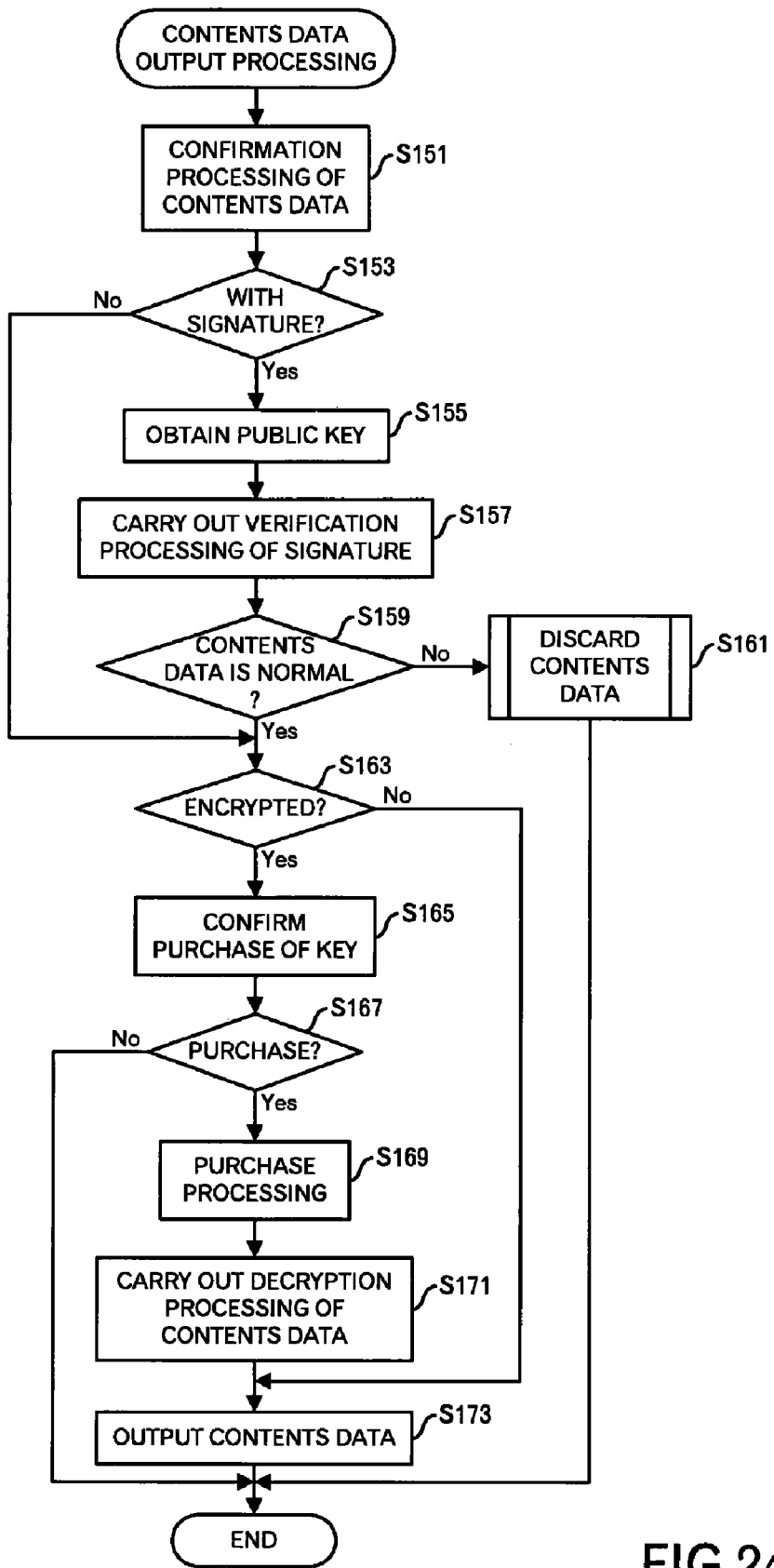
FIG. 24 is a diagram showing a eighth processing flow in this embodiment.

In such a case, it is necessary to carry out a processing as shown in FIG. 24. The processing of FIG. 24 is a processing carried out at the step S7, the step S15, the step S25 and the like in FIG. 3, for example. First, when the communication controller 23 obtains the contents data instructed by the user to output it, the communication controller 23 confirms the format or the like of the contents data (step S151). Then, the communication controller 23 judges whether or not the electronic signature is attached to the contents data (step S153). When the electronic signature is not attached, the processing shifts to step S163. On the other hand, when the electronic signature is attached, the communication controller 23 carries out a processing to acquire a public key of the distributor or the creator of the contents data (step S155). For example, the public key is acquired from the cache 25 through the cache controller 24 when the public key is stored with the contents data in the cache 25. When the public key does not exist in the cache 25, the communication controller 23 causes the wireless phone communication processor 21 to connect with the base station 9, to acquire the public key from the contents server 3 or the like.

Then, the communication controller 23 carries out a verification processing of the electronic signature by using the acquired public key (step S157). This processing is not described further, because it is a well-known technique. Then, the communication controller 23 judges whether or not the contents data is normal (step S159). That is, the communication controller 23 judges whether or not the data is counterfeited, modified or includes the data damage. When it is judged that the contents data is not normal, the communication controller 23 discards the contents data (step S161), and the processing shifts to the step S13 of FIG. 3, for example.

On the other hand, when the contents data is normal, the communication controller 23 confirms whether or not it is encrypted (step S163). Because it is plaintext contents data when it is not encrypted, the communication controller 23 outputs the contents data to the controller 27 as it is. The controller 27 outputs the received contents data to the display device, for example, of the user interface unit 29 (step S173). On the other hand, when it is encrypted, the communication controller 23 requests the controller 27 to output a confirmation message such as "Do you buy the key?" (step S165). The controller 27 outputs the confirmation message to the display device, for example, of the user interface unit 29 in response to the request. In response to this, the user pushes a purchase button when he or she buys the key, and otherwise, pushes a cancel button. The controller 27 judges whether or not the purchase instruction was input (step S167) and when the purchase instruction was not input (when the cancel button was clicked), the processing is terminated. That is, the controller 27 notifies the communication controller 23 of the cancellation of the processing. On the other hand, the controller 27 notifies the communication controller 23 of the purchase instruction when the purchase instruction was made. The communication controller 23 causes the wireless phone communication processor 21 to connect with the encrypted contents server 7, for example, through the base station 9, and to carry out a predetermined purchase processing (step S169). Because there are various settlement methods and the processing for those methods is also well known, the explanation is omitted here. Then, the communication controller 23 acquires the key as a result of the purchase processing. The communication controller 23 carries out a decryption processing of the encrypted contents data by using the key (step S171). The decrypted contents data is temporarily stored into a memory such as a main memory, and output to the controller 27. The controller 27 outputs the decrypted plaintext contents data through the user interface unit 29 (step S173).

By carrying out the aforementioned processing, it is possible to provide the user with the contents data after confirming that it is the genuine contents data by the electronic signature, and furthermore when it is the encrypted contents data, it is possible to provide the user with the plaintext contents data through the purchase procedure. Incidentally, the contents data may be stored into the data storage 30, for example, when it becomes plaintext.

Although one embodiment of this invention was described above, this invention is not limited to this. For example, although the functional block diagram of the mobile terminal 100 was shown in FIG. 2, the functional classification is not limited to this. In addition, the cache 25 and the data storage 30 may be realized by dividing one storage area. Moreover, plural kinds of short distance wireless communication processors 22 such as the wireless LAN and Bluetooth may be equipped and switched according to the situation. Although the mobile terminal 100 is an information portable terminal such as a Personal Digital Assistant (PDA), it may be a mobile phone with enhanced functions. Moreover, it may be a car navigation system with enhanced functions. The kinds of servers connected with the network 1 are not limited to three, and there is a case the servers may be categorized into three or more kinds.

Moreover, although an example that the verification processing of the electronic signature, the decryption processing of the encrypted contents data and the like are carried out by the communication controller 23 is shown, those processings may be carried out by the controller 27.

Figure 25:
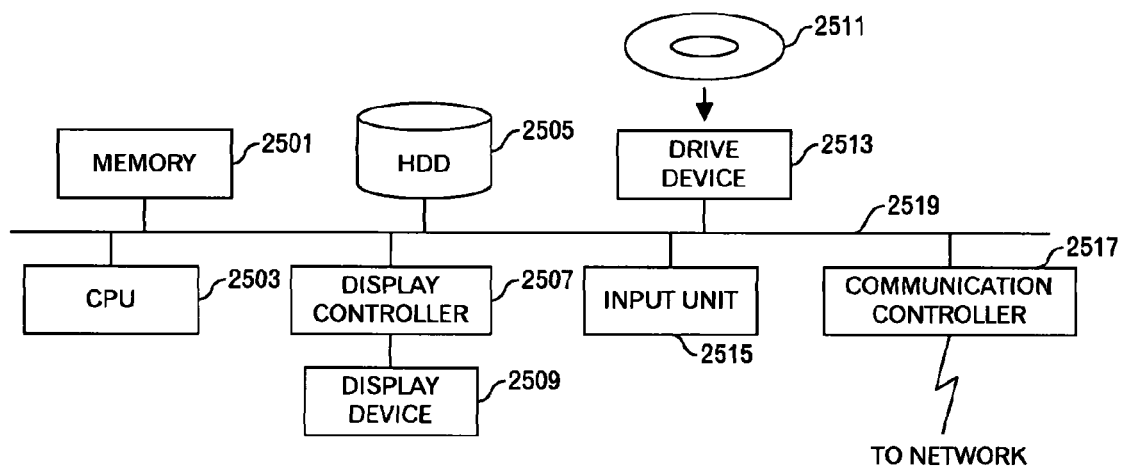
FIG. 25 is a functional block diagram of a computer.

Incidentally, the aforementioned contents server 3, the broadcast contents server 5 and the encrypted contents server 7 are computer devices as shown in FIG. 25. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 28. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in details are realized.

In addition, the mobile terminal has a configuration that a data storage by a semiconductor memory is connected instead of the HDD 2505, and a reader/writer of a semiconductor memory card is connected instead of the drive device 2513 in FIG. 25.

What is claimed is:

1. A mobile wireless communication terminal, comprising:
   a first communication unit used for communication with a base station;
   a second communication unit used for communication with other mobile wireless communication terminals;
   a storage device storing contents data that can be used in said mobile wireless communication terminal and can be transmitted to said other mobile wireless communication terminals; and
   a communication controller that obtains specific contents data by searching said storage device when said specific contents data is requested, transmitting, by packet broadcast, a request of said specific contents data to said other mobile wireless communication terminals that can communicate via said second communication unit when the valid specific contents data is not detected in said storage device, and transmitting a request of said specific contents data to said base station via said first communication unit when said specific contents data cannot be received from said other mobile wireless communication terminals, which can communicate, within a predetermined time, and wherein, when receiving a second request of second contents data by said packet broadcast from another mobile wireless communication terminal, said communication controller searches said storage device for the requested second contents data, replies with said requested second contents data to said another mobile wireless communication terminal when the valid requested second contents data is detected in said storage device, and transfers the received second request of said second contents data by said packet broadcast to other mobile wireless communication terminals when said second contents data is not detected in said storage device, and
   upon detecting that lack of a packet exists among packets for said specific contents data, which were received from said other mobile wireless communication terminals that are different from said base station, said communication controller causes the first communication unit to transmit a request for data of at least a lacked packet through said base station to a contents delivery computer.

2. The mobile wireless communication terminal as set forth in claim 1, wherein said communication controller judges, based on at least either a number of request relay times or presence or absence of registration to a relayed packet list, whether or not said second request of said second contents data should be transferred.

3. The mobile wireless communication terminal as set forth in claim 1, wherein expiration date is attached to said contents data.

4. The mobile wireless communication terminal as set forth in claim 1, wherein said communication controller registers an address of said mobile wireless communication terminal of a generation source of said second request in association with an address of said mobile wireless communication terminal of a transmission source of said second request into a relay table, when said second request of said second contents data by said packet broadcast is received, and
   said communication controller refers to said relay table when a relay packet other than a broadcast packet is received, and transmits said relay packet to said address of said mobile wireless communication terminal of the corresponding transmission source in said relay table, when an original destination address of said relay packet is registered as said address of said mobile wireless communication terminal of said generation source.

5. The mobile wireless communication terminal as set forth in claim 1, wherein said communication controller stores a packet including said contents data and received from said other mobile wireless communication terminals into said storage device, regardless of whether or not said packet is addressed to this mobile wireless communication terminal.

6. The mobile wireless communication terminal as set forth in claim 1, wherein said communication controller transmits a request of a list of stored contents data
   to other mobile wireless communication terminals, which can communicate, and identifies contents data to be requested for said other mobile wireless communication terminals, and transmits a request of the identified contents data to said other mobile wireless communication terminal, when said list of said contents data is received from said other mobile wireless communication terminal.

7. The mobile wireless communication terminal as set forth in claim 1, wherein said communication controller confirms a communication processing state in said first and second communication units and a storage processing state to said storage device when a power-off is instructed by a user of said mobile wireless communication terminal, and carries out a processing to carry out said power-off of said mobile wireless communication terminal after the communication processing and the storage processing.

8. The mobile wireless communication terminal as set forth in claim 1, wherein an electronic signature by an owner or a distributor of contents data in said storage device is attached to said contents data, and a verification processing of said contents data is carried out by using said electronic signature when a use request of said contents data by a user of said mobile wireless communication terminal is accepted.

9. The mobile wireless communication terminal as set forth in claim 1, wherein said contents data is encrypted, when the encrypted contents data is stored in said storage device, and a use request of said contents data by a user of said mobile wireless communication is accepted, an acquiring processing of a decryption key is carried out in response to an instruction of said user, and when said decryption key is acquired, a decryption processing is carried out to carry out an output processing of said contents data.

10. The mobile wireless communication terminal as set forth in claim 1, wherein said communication controller refers to data concerning use frequency of said contents data to determine a transmission order of said contents data when a plurality of sets of said contents data are transmitted via said second communication unit.

11. The mobile wireless communication terminal as set forth in claim 1, wherein said communication controller transmits a request of contents data identified based on a predetermined reference to a wireless communication base station that communicates using a communication method used for said other mobile wireless communication terminals via said second communication unit, when said wireless communication base station connectable with the second communication unit is detected.

12. The mobile wireless communication terminal as set forth in claim 1, wherein said communication controller stores said contents data in a complete state, which was received via said second communication unit from a wireless communication base station that communicates using a communication method used for said other mobile wireless communication terminals, into said storage device, when said wireless communication base station that broadcasts predetermined contents data is detected.

13. A communication control method executed by a mobile wireless communication terminal having a first communication unit used for communication with a base station, and a second communication unit used for other mobile wireless communication terminal, said communication control method comprising:
   searching a storage device storing contents data that can be used in said mobile wireless communication terminal and can be transmitted to said other mobile wireless communication terminals, in response to detecting that specific contents data is requested;
   transmitting, by packet broadcast, a request of said specific contents data to said other mobile wireless communication terminals that can communicate via said second communication unit in response to detecting that the valid specific contents data is not detected in said storage device;
   transmitting a request of said specific contents data to said base station via said first communication unit in response to detecting that said specific contents data cannot be received from said other mobile wireless communication terminals, which can communicate, within a predetermined time;
   upon receiving a second request of second contents data by said packet broadcast from another mobile wireless communication terminal, searching said storage device for the requested second contents data and replying with said second requested contents data to said another mobile wireless communication terminal when the valid requested second contents data is detected in said storage device;
   transferring the received second request of said second contents data by said packet broadcast to other mobile wireless communication terminals, upon detecting that said second contents data is not detected in said storage device; and
   upon detecting that lack of a packet exists among packets for said specific contents data, which were received from said other mobile wireless communication terminals that are different from said base station, causing the first communication unit to transmit a request for data of at least a lacked packet through said base station to a contents delivery computer.

14. A non-transitory computer-readable storage medium storing a program for causing a mobile wireless communication terminal having a first communication unit used for communication with a base station and a second communication unit used for other mobile wireless communication terminal to execute a process, comprising:
   searching a storage device storing contents data that can be used in said mobile wireless communication terminal and can be transmitted to said other mobile wireless communication terminals, in response to detecting that specific contents data is requested;
   transmitting, by packet broadcast, a request of said specific contents data to said other mobile wireless communication terminals that can communicate via said second communication unit in response to detecting that the valid specific contents data is not detected in said storage device;
   transmitting a request to said base station via said first communication unit in response to detecting that said specific contents data cannot be received from said other mobile wireless communication terminals, which can communicate, within a predetermined time;
   upon receiving a second request of second contents data by said packet broadcast from another mobile wireless communication terminal, searching said storage device for the requested second contents data and replying with said second requested contents data to said another mobile wireless communication terminal when the valid requested second contents data is detected in said storage device;
   transferring the received second request of said second contents data by said packet broadcast to other mobile wireless communication terminals, upon detecting that said second contents data is not detected in said storage device; and
   upon detecting that lack of a packet exists among packets for said specific contents data, which were received from said other mobile wireless communication terminals that are different from said base station, causing the first communication unit to transmit a request for data of at least a lacked packet through said base station to a contents delivery computer.

* * * * *